(12) United States Patent
Blackbourn et al.

(10) Patent No.: US 9,290,821 B2
(45) Date of Patent: *Mar. 22, 2016

(54) TREATING BIOMASS TO PRODUCE MATERIALS USEFUL FOR BIOFUELS

(75) Inventors: Robert Lawrence Blackbourn, Houston, TX (US); Paul Richard Weider, Houston, TX (US)

(73) Assignee: Shell Oil Company, Houston, TX (US)

(*) Notice: Subject to any disclaimer, the term of this patent is extended or adjusted under 35 U.S.C. 154(b) by 1067 days.

This patent is subject to a terminal disclaimer.

(21) Appl. No.: 13/288,687

(22) Filed: Nov. 3, 2011

(65) Prior Publication Data

US 2012/0122152 A1    May 17, 2012

Related U.S. Application Data

(60) Provisional application No. 61/410,689, filed on Nov. 5, 2010.

(51) Int. Cl.
| | |
|---|---|
| *C07H 1/08* | (2006.01) |
| *C12P 1/00* | (2006.01) |
| *C07H 3/02* | (2006.01) |
| *C07D 307/50* | (2006.01) |
| *C13K 13/00* | (2006.01) |
| *C08H 8/00* | (2010.01) |
| *C13K 1/02* | (2006.01) |
| *C13K 1/04* | (2006.01) |

(52) U.S. Cl.
CPC ............... *C13K 13/002* (2013.01); *C08H 8/00* (2013.01); *C13K 1/02* (2013.01); *C13K 1/04* (2013.01)

(58) Field of Classification Search
None
See application file for complete search history.

(56) References Cited

U.S. PATENT DOCUMENTS

| | | | |
|---|---|---|---|
| 2,308,564 | A | 1/1943 | McKee |
| 3,248,278 | A | 4/1966 | Wilson |
| 3,549,319 | A | 12/1970 | Wilson et al. |
| 3,821,355 | A | 6/1974 | Bandyopadhyay et al. |
| 4,113,842 | A | 9/1978 | McCullough et al. |
| 4,238,459 | A | 12/1980 | Phillips, Jr. et al. |
| 4,306,101 | A | 12/1981 | Slaugh et al. |
| 4,316,008 | A | 2/1982 | Willis et al. |
| 4,395,356 | A | 7/1983 | Slaugh et al. |
| 4,396,761 | A | 8/1983 | Willis et al. |
| 4,409,032 | A | 10/1983 | Paszner et al. |
| 4,461,648 | A | 7/1984 | Foody |
| 4,612,286 | A | 9/1986 | Sherman et al. |
| 4,669,545 | A | 6/1987 | Slaugh |
| 5,536,325 | A | 7/1996 | Brink |
| 5,789,210 | A | 8/1998 | Ho et al. |
| 5,820,687 | A | 10/1998 | Farone et al. |
| 6,475,768 | B1 | 11/2002 | Otero et al. |
| 7,741,084 | B2 | 6/2010 | Viitanen et al. |
| 7,741,119 | B2 | 6/2010 | Viitanen et al. |
| 7,781,191 | B2 | 8/2010 | Dunson, Jr. et al. |
| 2003/0162271 | A1 | 8/2003 | Zhang et al. |
| 2008/0216391 | A1 | 9/2008 | Cortright et al. |
| 2009/0061490 | A1 | 3/2009 | Edwards et al. |
| 2010/0184151 | A1 | 7/2010 | Tolan et al. |
| 2011/0154721 | A1 | 6/2011 | Chheda et al. |
| 2011/0282115 | A1 | 11/2011 | Chheda et al. |

FOREIGN PATENT DOCUMENTS

| | | | |
|---|---|---|---|
| EP | 1727890 | | 5/2008 |
| IT | WO2010/015404 | * 2/2010 | ............... C13K 1/02 |
| WO | 9513362 | | 5/1995 |
| WO | 9742307 | | 11/1997 |
| WO | 0202826 | | 1/2002 |
| WO | 2006007691 | | 1/2006 |
| WO | 2006096130 | | 9/2006 |
| WO | 2007009463 | | 1/2007 |
| WO | 2007028811 | | 3/2007 |
| WO | 2007136762 | | 11/2007 |
| WO | 2008119082 | | 10/2008 |
| WO | 2009109631 | | 9/2009 |
| WO | 2010026572 | | 3/2010 |
| WO | 2010029568 | | 3/2010 |
| WO | 20100046051 | | 4/2010 |
| WO | 2010071805 | | 6/2010 |
| WO | 2012061596 | | 5/2012 |
| WO | 2013082141 | | 6/2013 |

OTHER PUBLICATIONS

Wikipedia, Autoclave, Accessed Feb. 8, 2015, online at: en.wikipedia.org/wiki/Autoclave.*
Galbe, M. et al.; "A review of the production of ethanol from softwood"; Appl Microbiol Biotechnol; vol. 59; pp. 618-628; 2002.
Ong Lim Koon; "Conversion of Lignocellulosic Biomass to Fuel Ethanol—a Brief Review"; The Planter; vol. 80 No. 941; pp. 517-524; Aug. 2004.
Moller, Dr. Ralf; "Cell Wall Saccharification"; Outputs from the EPOBIO project; pp. 1-69; 2006.
Holtzapple, M.T., et al.; "The ammonia freeze explosion (AFEX) process—a practical lignocellulose pretreatment"; Applied Biochemistry and Biotechnology; vol. 28/29; pp. 59-74; 1991.
Kumar, P. et al.; "Methods for Pretreatment of Lignocellulosic Biomass for Efficient Hydroloysis and Biofuel Production" ; Ind. Eng. Chem. Res.; vol. 48; pp. 3713-3729; 2009.
Lavarak, B.P., et al: The acid hydrolysis of sugarcane bagasse hemicelluloses to product xylose, arabinose, glucose and other product; Biomass and Bioenergy; vol. 23; pp. 367-380; 2002.
Brown, Robert; "Fast Pyrolysis and Bio-Oil Upgrading, Biomass-to-Diesel Workshop"; Pacific Northwest National Laboratory; pp. 1-46 ; Sep. 5-6, 2006.
Mosier, N., et al: "Features of promising technologies for pretreatment of lignocellulosic biomass"; Bioresource Technology; vol. 96; pp. 673-686; 2005.

(Continued)

*Primary Examiner* — Karen Cochrane Carlson
*Assistant Examiner* — Jennifer M. H. Tichy

(57) ABSTRACT

Fermentable sugar useful for the production of biofuels can be produced from biomass by contacting the biomass with a solution containing at least one α-hydroxysulfonic acid. The α-hydroxysulfonic acid can be easily removed from the product and recycled.

35 Claims, 3 Drawing Sheets

(56) References Cited

OTHER PUBLICATIONS

Humbird, D., et al.; "Economic Impact of Total Solids Loading on Enzymatic Hydrolysis of Dilute Acid Pretreated Corn Stover"; Biotechnol. Prog., vol. 26, No. 5, pp. 1245-1251; May 26, 2010.
International Search Report dated Mar. 26, 2012 for PCT/US2011/059140, a counterpart application; 5 pages.
International Search Report for related application PCT/US2013/039843 dated Jul. 19, 2013; 5 pages.
Balat, M. et al.; "Recent trends in global production and utilization of bio-ethanol fuels"; Applied Energy; vol. 86; pp. 2273-2282; 2009.
Araki, M., "Chemical Reaction Between Cellulose and Formaldehyde", Chapter 1—Preparation of Methylene Cellulose and its Methylation, Div. of Wood Chemistry, Wood Research, No. 33, 1964, pp. 1-7.
Balgrie, L. M. et al., "Acid-Catalyzed Enolization and Aldol Condensation of Acetaldehyde", J. Am. Chem. Soc., 1985, vol. 107, pp. 3640-3645.
Frick, J.G. et al., "Crosslinking Cotton Cellulose With Aldehydes", Southern Regional Research Center, New Orleans, LA, Journal of Applied Polymer Science, vol. 27, 1982, pp. 983-988.
Kirk-Othmer, Encyclopedia of Chemical Technology, Sulfonation and Sulfation to Thorium and Thorium Compounds, 3rd Ed., vol. 22, 1983.

* cited by examiner

TREATING BIOMASS TO PRODUCE MATERIALS USEFUL FOR BIOFUELS

The present application claims the benefit of pending U.S. Provisional Patent Application Ser. No. 61/410,689, filed Nov. 5, 2010, the entire disclosure of which is hereby incorporated by reference.

FIELD OF THE INVENTION

The invention relates to a process for treating biomass, and more specifically to a pretreatment of biomass for the production of sugars from materials containing polysaccharides, for use in biofuel or other high value products.

BACKGROUND OF THE INVENTION

Lignocellulosic biomass is viewed as an abundant renewable resource for fuels and chemicals due to the presence of sugars in the cell walls of plants. More than 50% of the organic carbon on the earth's surface is contained in plants. This lignocellulosic biomass is comprised of hemicelluloses, cellulose and smaller portions of lignin and protein. Cellulose is a polymer comprised mostly of condensation polymerized glucose and hemicellulose is a precursor to pentose sugars, mostly xylose. These sugars can easily be converted into fuels and valuable components, provided they can be liberated from the cell walls and polymers that contain them. However, plant cell walls have evolved considerable resistance to microbial, mechanical or chemical breakdown to yield component sugars. A number of approaches to overcome this recalcitrance have been performed and the breakdown of these polymers into sugars, saccharification, has a long history. General methods are outlined schematically in FIG. 1.

The original approaches dating back to the early 19th century involve complete chemical hydrolysis using concentrated mineral acids such as hydrochloric acid, nitric, or sulfuric acid. Numerous improvements to these processes have been made earning higher sugar yields from the biomass feedstock. These higher acid concentration approaches provide higher yields of sugars, but due to economic and environmental reasons the acids must be recovered. The primary obstacle to practicing this form of saccharification has been the challenges associated with recovery of the acid (M. Galbe and G. Zacchi, A review of the production of ethanol from softwood, *Appl. Microbiol. Biotechnol.* 59 (2002), pp. 618-628). Recent efforts toward separating sulfuric acid and sugars using ion resin separation or hydrochloric acid and sugars via amine extraction and subsequent thermal regeneration of the acid have been described in U.S. Pat. No. 5,820,687 and WO2010026572. Both approaches are cumbersome and expensive.

Dilute acid processes have also been attempted to perform chemical Saccharification and one such example is the Scholler-Tornesch Process. However usage of dilute acid requires higher temperatures and this usually results in low yields of the desired sugars due to thermal degradation of the monsaccharides. Numerous approaches of this type have been made in the past and all have failed to meet economic hurdles. See Lim Koon Ong, Conversion of lignocellulosic biomass to fuel ethanol—A brief review, *The Planter*, Vol. 80, No. 941, August 2004 and Cell Wall Saccharification, Ralf Möller, Outputs from the EPOBIO project, 2006; Published by CPL Press, Tall Gables, The Sydings, Speen, Newbury, Berks RG14 1RZ, UK.

The Saccharification of the cellulose enzymatically holds promise of greater yields of sugars under milder conditions and is therefore considered by many to be more economically attractive. The recalcitrance of the raw biomass to enzymatic hydrolysis necessitates a pretreatment to enhance the susceptibility of the cellulose to hydrolytic enzymes. A number of pretreatment methods, such as described in Nathan Mosier, Charles Wyman, Bruce Dale, Richard Elander, Y. Y. Lee, Mark Holtzapple, Michael Ladisch '*Features of promising technologies for pretreatment of lignocellulosic biomass*" Bioresource Technology 96 (2005) pp. 673-686, have been developed to alter the structural and chemical composition of biomass to improve enzymatic conversion. Such methods include treatment with dilute acid steam explosion described in U.S. Pat. No. 4,461,648, hydrothermal pretreatment without the addition of chemicals described in WO 2007/009463 A2, ammonia freeze explosion described in AFEX; Holtzapple, M. T., Jun, J., Ashok, G., Patibandla, S. L., Dale, B. E., 1991, *The ammonia freeze explosion (AFEX) process-a practical lignocellulose pretreatment*, Applied Biochemistry and Biotechnology 28/29, pp. 59-74, and organosolve extraction described in U.S. Pat. No. 4,409,032. Despite this, pretreatment has been cited as the most expensive process in biomass-to-fuels conversion ("Methods for Pretreatment of Lignocellulosic Biomass for Efficient Hydrolysis and Biofuel Production" Ind. Eng. Chem. Res., 2009, 48(8), 3713-3729.)

One pretreatment that has been extensively explored is a high temperature, dilute-sulfuric acid ($H_2SO_4$) process, which effectively hydrolyzes the hemicellulosic portion of the biomass to soluble sugars and exposes the cellulose so that enzymatic Saccharification is successful. The parameters which can be employed to control the conditions of the pretreatment are time, temperature, and acid loading. These are often combined in a mathematical equation termed the combined severity factor. In general, the higher the acid loading employed, the lower the temperature that can be employed; this comes at a cost of acid and its recycle. Conversely, the lower the temperature, the longer the pretreatment process takes; this comes at the cost of volumetric productivity. It is desirable to lower the temperature because pentose sugars readily decompose to form furfurals and other species which represents a yield loss and these compounds are poisons to downstream fermentation. However the use of the higher concentrations of acid required to lower the pretreatment temperatures below that where furfural formation becomes facile (B. P. Lavarack, G. J. Griffin, D. Rodman "The acid hydrolysis of sugarcane bagasse hemicelluloses to product xylose, arabinose, glucose and other products." *Biomass and Bioenergy* 23 (2002) pp. 367-380) once again requires the recovery of the strong acid. If dilute acid streams and higher temperatures are employed the pretreatment reaction produces increased amounts of furfural and the acid passing downstream must be neutralized resulting in inorganic salts which complicates downstream processing and requires more expensive waste water treatment systems.

SUMMARY OF THE INVENTION

Given the above information it is desirable to utilize a strong acid that is easily reverted to recoverable and or recyclable, preferably neutral components. Such a system would benefit both the concentrated acid hydrolysis methods and the dilute acid biomass pretreatment.

In an embodiment of the present invention comprises, a method comprising: (a) providing a biomass containing polysaccharides; and (b) contacting the biomass with a solution containing at least one α-hydroxysulfonic acid thereby hydrolyzing the biomass to produce at least one fermentable sugar containing product.

In another embodiment, a method comprises (c) removing the α-hydroxysulfonic acid in its component form from the product by heating and/or reducing pressure to produce an acid-removed product containing at least one fermentable sugar substantially free of the α-hydroxysulfonic acid.

In another embodiment, a method comprises recycling the removed α-hydroxysulfonic acid as components to step (b) as components or in its recombined form.

In yet another embodiment, a method comprises further hydrolyzing the acid-removed product.

In yet another embodiment, a method comprises fermenting a stream containing sugars produced by the above methods.

In yet another embodiment, a composition comprises (a) biomass containing polysaccharides, (b) at least one α-hydroxysulfonic acid, and (c) water.

In yet another embodiment, a composition comprises (a) biomass containing polysaccharides, (b) at least one α-hydroxysulfonic acid (c) water, and (d) at least one fermentable sugar.

The features and advantages of the invention will be apparent to those skilled in the art. While numerous changes may be made by those skilled in the art, such changes are within the spirit of the invention.

BRIEF DESCRIPTION OF THE DRAWING

This drawing illustrates certain aspects of some of the embodiments of the invention, and should not be used to limit or define the invention.

DETAILED DESCRIPTION OF THE INVENTION

Figure 1:
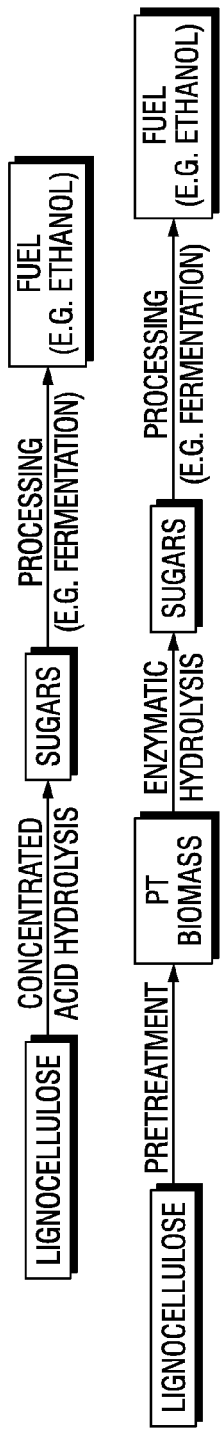
FIG. 1 schematically illustrates a block flow diagram of lignocellulose treatments.

It has been found that the present invention provides an improved method for the acid treatment of biomass in a process for producing sugars and biofuels. The α-hydroxysulfonic acid is effective for treatment of biomass hydrolyzing the biomass to fermentable sugars like pentose such as xylose at lower temperature, e.g., about 100° C. for α-hydroxymethane sulfonic acid or α-hydroxyethane sulfonic acid, producing little to no furfural in the process. A portion of the cellulose has also been show to hydrolyze under these comparatively mild conditions. It has been found that other polysaccharides such as starch are also readily hydrolyzed to component sugars by α-hydroxy sulfonic acids. Further, the α-hydroxysulfonic acid is reversible to readily removable and recyclable materials unlike mineral acids such as sulfuric, phosphoric, or hydrochloric acid. The lower temperatures and pressures employed in the biomass treatment leads to lower equipment cost. Biomass pretreated in this manner has been shown to be highly susceptible to additional saccharification, especially enzyme mediated saccharification.

The alpha-hydroxysulfonic acids of the general formula

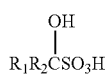

where $R_1$ and $R_2$ are individually hydrogen or hydrocarbyl with up to about 9 carbon atoms that may or may not contain oxygen can be used in the treatment of the instant invention. The alpha-hydroxysulfonic acid can be a mixture of the aforementioned acids. The acid can generally be prepared by reacting at least one carbonyl compound or precursor of carbonyl compound (e.g., trioxane and paraformaldehyde) with sulfur dioxide or precursor of sulfur dioxide (e.g., sulfur and oxidant, or sulfur trioxide and reducing agent) and water according to the following general equation 1.

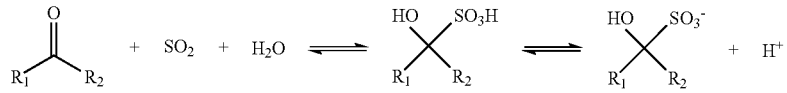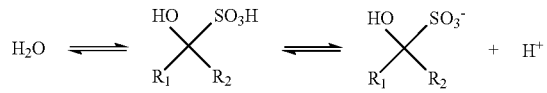

where $R_1$ and $R_2$ are individually hydrogen or hydrocarbyl with up to about 9 carbon atoms or a mixture thereof.

Illustrative examples of carbonyl compounds useful to prepare the alpha-hydroxysulfonic acids used in this invention are found where $R_1$=$R_2$=H (formaldehyde)
$R_1$=H, $R_2$=$CH_3$ (acetaldehyde)
$R_1$=H, $R_2$=$CH_2CH_3$ (propionaldehyde)
$R_1$=H, $R_2$=$CH_2CH_2CH_3$ (n-butyraldehyde) $R_1$=H, $R_2$=$CH(CH_3)_2$ (i-butyraldehyde)
$R_1$=H, $R_2$=$CH_2OH$ (glycolaldehyde)
$R_1$=H, $R_2$=$CHOHCH_2OH$ (glyceraldehdye)
$R_1$=H, $R_2$=C(=O)H (glyoxal)

$R_1$ = H, $R_2$ = 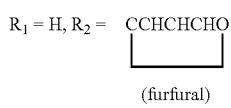

(furfural)

$R_1$=H, $R_2$=

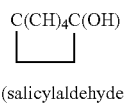

(salicylaldehyde)

$R_1=H$, $R_2=$

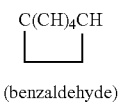

(benzaldehyde)

$R_1=R_2=CH_3$ (acetone)
$R_1=CH_2OH$, $R_2=CH_3$ (acetol)
$R_1=CH_3$, $R_2=CH_2CH_3$ (methyl ethyl ketone)
$R_1=CH_3$, $R_2=CHC(CH_3)_2$ (mesityl oxide)
$R_1=CH_3$, $R_2=CH_2CH(CH_3)_2$ (methyl i-butyl ketone)
$R_1$, $R_2=(CH_2)_5$ (cyclohexanone) or
$R_1=CH_3$, $R_2=CH_2Cl$ (chloroacetone)

The carbonyl compounds and its precursors can be a mixture of compounds described above. For example, the mixture can be a carbonyl compound or a precursor such as, for example, trioxane which is known to thermally revert to formaldehyde at elevated temperatures or an alcohol that maybe converted to the aldehyde by dehydrogenation of the alcohol to an aldehyde by any known methods. An example of such a conversion to aldehyde from alcohol is described below. An example of a source of carbonyl compounds maybe a mixture of hydroxyacetaldehyde and other aldehydes and ketones produced from fast pyrolysis oil such as described in "Fast Pyrolysis and Bio-oil Upgrading, Biomass-to-Diesel Workshop", Pacific Northwest National Laboratory, Richland, Wash., Sep. 5-6, 2006. The carbonyl compounds and its precursors can also be a mixture of ketones and/or aldehydes with or without alcohols that may be converted to ketones and/or aldehydes, preferably in the range of 1 to 7 carbon atoms.

The preparation of α-hydroxysulfonic acids by the combination of an organic carbonyl compounds, $SO_2$ and water is a general reaction and is illustrated in equation 2 for acetone.

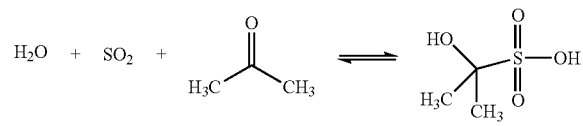

The α-hydroxysulfonic acids appear to be as strong as, if not stronger than, HCl since an aqueous solution of the adduct has been reported to react with NaCl freeing the weaker acid, HCl (see U.S. Pat. No. 3,549,319). The reaction in equation 1 is a true equilibrium, which results in facile reversibility of the acid. That is, when heated, the equilibrium shifts towards the starting carbonyl, sulfur dioxide, and water (component form). If the volatile components (e.g. sulfur dioxide) is allowed to depart the reaction mixture via vaporization or other methods, the acid reaction completely reverses and the solution becomes effectively neutral. Thus, by increasing the temperature and/or lowering the pressure, the sulfur dioxide can be driven off and the reaction completely reverses due to Le Châtelier's principle, the fate of the carbonyl compound is dependant upon the nature of the material employed. If the carbonyl is also volatile (e.g. acetaldehyde), this material is also easily removed in the vapor phase. Carbonyl compounds such as benzaldehyde, which are sparingly soluble in water, can form a second organic phase and be separated by mechanical means. Thus, the carbonyl can be removed by conventional means, e.g., continued application of heat and/or vacuum, steam and nitrogen stripping, solvent washing, centrifugation, etc. Therefore, the formation of these acids is reversible in that as the temperature is raised, the sulfur dioxide and/or aldehyde and/or ketone can be flashed from the mixture and condensed or absorbed elsewhere in order to be recycled. It has been found that these reversible acids, which are approximately as strong as strong mineral acids, are effective in biomass treatment reactions. We have found that these treatment reactions produce very few of the undesired byproducts, furfurals, produced by other conventional mineral acids. Additionally, since the acids are effectively removed from the reaction mixture following treatment, neutralization with base and the formation of salts to complicate downstream processing is substantially avoided. The ability to reverse and recycle these acids also allows the use of higher concentrations than would otherwise be economically or environmentally practical. As a direct result, the temperature employed in biomass treatment can be reduced to diminish the formation of byproducts such as furfural or hydroxymethylfurfural.

It has been found that the position of the equilibrium given in equation 1 at any given temperature and pressure is highly influenced by the nature of the carbonyl compound employed, steric and electronic effects having a strong influence on the thermal stability of the acid. More steric bulk around the carbonyl tending to favor a lower thermal stability of the acid form. Thus, one can tune the strength of the acid and the temperature of facile decomposition by the selection of the appropriate carbonyl compound.

In one embodiment, the acetaldehyde starting material to produce the alpha-hydroxysulfonic acids can be provided by converting ethanol, produced from the fermentation of the treated biomass of the invention process, to acetaldehyde by dehydrogenation or oxidation. Dehydrogenation may be typically carried out in the presence of copper catalysts activated with zinc, cobalt, or chromium. At reaction temperatures of about 260-290° C., the ethanol conversion per pass is 30-50% and the selectivity to acetaldehyde is between 90 and 95 mol %. By-products include crotonaldehyde, ethyl acetate, and higher alcohols. Acetaldehyde and unconverted ethanol are separated from the exhaust hydrogen-rich gas by washing with ethanol and water. Pure acetaldehyde is recovered by distillation, and an additional column is used to separate ethanol for recycle from higher-boiling products. It may not be necessary to supply pure aldehdye to the α-hydroxysulfonic acid process above and the crude stream may suffice. The hydrogen-rich off-gas is suitable for hydrogenation reactions or can be used as fuel to supply some of the endothermic heat of the ethanol dehydrogenation reaction. The copper-based catalyst has a life of several years but requires periodic regeneration. In an oxidation process, ethanol maybe converted to acetaldehyde in the presence of air or oxygen and using a silver catalyst in the form of wire gauze or bulk crystals. Typically, the reaction is carried out at temperatures between 500° and 600° C., depending on the ratio of ethanol to air. Part of the acetaldehyde is also formed by dehydrogenation, with further combustion of the hydrogen to produce water. At a given reaction temperature, the endothermic heat of dehydrogenation partly offsets the exothermic heat of oxidation. Ethanol conversion per pass is typically between 50 and 70%, and the selectivity to acetaldehyde is in the range of 95 to 97 mol %. By-products include acetic acid, CO and $CO_2$. The separation steps are similar to those in the dehydrogenation process, except that steam is generated by heat recovery of the reactor effluent stream. The off-gas steam consists of nitrogen containing some methane, hydrogen, carbon monoxide and carbon dioxide; it can be used as lean fuel with low calorific value. An alternative method to produce acetaldehyde by air oxidation of ethanol in the presence of a Fe—Mo catalyst. The reaction can be carried out at about 180-240° C. and atmospheric pressure using a multitubular reactor. According to patent examples, selectivities to acetaldehyde between 95 and 99 mol % can be obtained with ethanol conversion levels above 80%.

As used herein, the term "biomass" means organic materials produced by plants (e.g., leaves, roots, seeds and stalks). Common sources of biomass include: agricultural wastes (e.g., corn stalks, straw, seed hulls, sugarcane leavings, bagasse, nutshells, and manure from cattle, poultry, and hogs); wood materials (e.g., wood or bark, sawdust, timber slash, and mill scrap); municipal waste (e.g., waste paper and yard clippings); and energy crops (e.g., poplars, willows, switch grass, alfalfa, prairie bluestream, corn, soybean, algae and seaweed). The term "biomass" also refers to the primary building blocks of all the above, including, but not limited to, saccharides, lignins, celluloses, hemicelluloses, and starches. The term "polysaccharides" refers to polymeric carbohydrate structures, of repeating units (either mono- or di-saccharides) joined together by glycosidic bonds. These structures are often linear, but may contain various degrees of branching. Examples include storage polysaccharides such as starch and glycogen, and structural polysaccharides such as cellulose and chitin. The biomass is typically preprocessed to suitable particles size that may include grinding. Not intending to restrict the scope of the invention, it is typically found that it is easier to process smaller particles of biomass. Biomass that is size reduced to facilitate handling (e.g. less than 1.3 cm) are particularly susceptible materials.

In some embodiments, the reactions described below are carried out in any system of suitable design, including systems comprising continuous-flow (such as CSTR and plug flow reactors), batch, semi-batch or multi-system vessels and reactors and packed-bed flow-through reactors. For reasons strictly of economic viability, it is preferable that the invention is practiced using a continuous-flow system at steady-state equilibrium. In one advantage of the process in contrast with the dilute acids pretreatment reactions where residual acid is left in the reaction mixture (<1% wt. sulfuric acid), the lower temperatures employed using these acids (10 to 20% wt.) results in substantially lower pressures in the reactor resulting in potentially less expensive processing systems such as plastic lined reactors, duplex stainless reactors, and 2205 type reactors.

Figure 2:
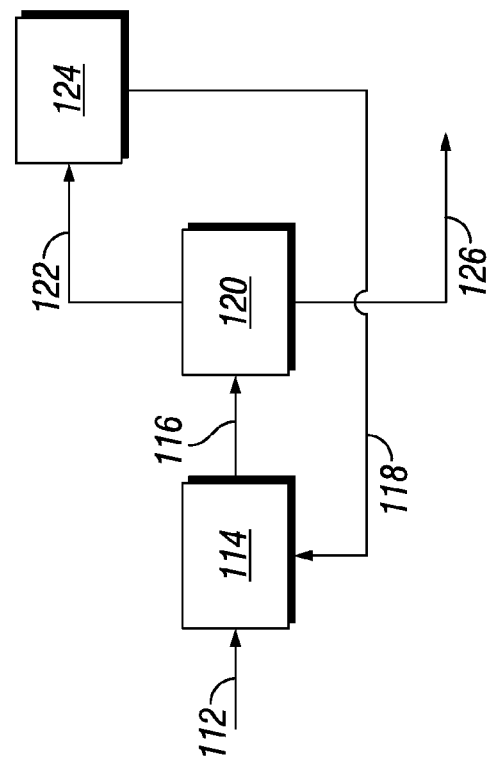
FIG. 2 schematically illustrates a block flow diagram of an embodiment of biomass treatment process of this invention.

FIG. 2 shows an embodiment of the present invention for converting biomass into sugars. In this embodiment, a biomass feedstock 112 is introduced to a hydrolysis reaction 114 along with a recycle stream 118. The hydrolysis reaction 114 can comprise a number of components including in situ generated α-hydroxysulfonic acid. The term "in situ" as used herein refers to a component that is produced within the overall process; it is not limited to a particular reactor for production or use and is therefore synonymous with an in process generated component. The reacted product stream 116 from 114 is introduced to acid removal system 120 where the acid is removed in its component form then is recovered 122 (and optionally scrubbed 124) and recycled via recycle stream 118 to 114 and product stream 126 containing at least one fermentable sugar (e.g., pentose and optionally hexose) substantially free of the alpha-hydroxysulfonic acids is produced for further processing. The removed acid as components is recycled to 114 as components and/or in its recombined form.

Figure 3:
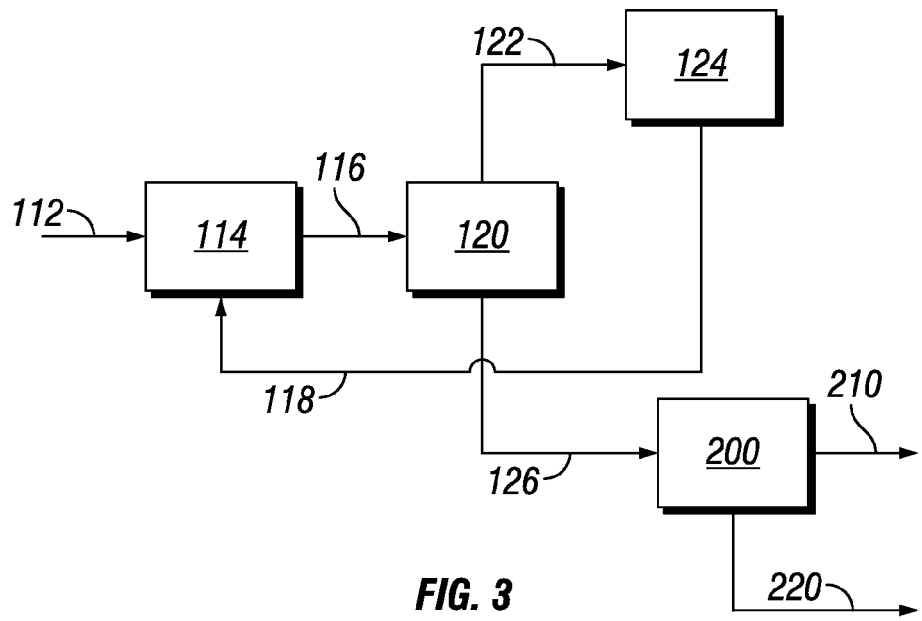
FIG. 3 schematically illustrates a block flow diagram of another embodiment of biomass treatment process of the invention.

FIG. 3 shows another embodiment of the present invention for converting biomass into sugars. In this embodiment, a biomass feedstock 112 is introduced to a hydrolysis reaction 114 along with a recycle stream 118. The hydrolysis reaction 114 can comprise a number of components including in situ generated α-hydroxysulfonic acid. The reacted product stream 116 from 114 is introduced to acid removal system 120 where the acid is removed in its component form then is recovered 122 (and optionally scrubbed 124) and recycled via recycle stream 118 to 114 and product stream 126 containing at least one fermentable sugar (e.g., pentose and optionally hexose) without the alpha-hydroxysulfonic acids is produced. The removed acid as components is recycled to 114 as components and/or in its recombined form. The product stream 126 is filtered 200 to produce a liquid stream 210 containing fermentable sugar (e.g., pentose and optionally hexose) and a wet solid stream 220 containing cellulose and lignin.

Various factors affect the conversion of the biomass feedstock in the hydrolysis reaction. The carbonyl compound or incipient carbonyl compound (such as trioxane) with sulfur dioxide and water should be added to in an amount and under conditions effective to form alpha-hydroxysulfonic acids. The temperature and pressure of the hydrolysis reaction should be in the range to form alpha-hydroxysulfonic acids and to hydrolyze biomass into fermentable sugars. The amount of carbonyl compound or its precursor and sulfur dioxide should be to produce alpha-hydroxysulfonic acids in the range from about 1 wt %, preferably from about 5 wt %, most preferably from about 10 wt %, to about 55 wt %, preferably to about 50 wt %, more preferably to about 40 wt %, based on the total solution. For the reaction, excess sulfur dioxide is not necessary, but any excess sulfur dioxide may be used to drive the equilibrium in eq. 1 to favor the acid form at elevated temperatures. The contacting conditions of the hydrolysis reaction may be conducted at temperatures preferably at least from about 50° C. depending on the alpha-hydroxysulfonic acid used, although such temperature may be as low as room temperature depending on the acid and the pressure used. The contacting condition of the hydrolysis reaction may range preferably up to and including about 150° C. depending on the alpha-hydroxysulfonic acid used. In a more preferred condition the temperature is at least from about 80° C., most preferably at least about 100° C. In a more preferred condition the temperature range up to and including about 90° C. to about 120° C. The reaction is preferably conducted at as low a pressure as possible, given the requirement of containing the excess sulfur dioxide. The reaction may also be conducted at a pressure as low as about 1 barg, preferably about 4 barg, to about pressure of as high as up to 10 barg The temperature and pressure to be optimally utilized will depend on the particular alpha-hydroxysulfonic acid chosen and optimized based on economic considerations of metallurgy and containment vessels as practiced by those skilled in the art.

The amount of acid solution to "dry weight" biomass determines the ultimate concentration of fermentable sugar obtained. Thus, as high a biomass concentration as possible is desirable. This is balanced by the absorptive nature of biomass with mixing, transport and heat transfer becoming increasingly difficult as the relative amount of biomass solids to liquid is increased. Numerous methods have been utilized by those skilled in the art to circumvent these obstacles to mixing, transport and heat transfer. Thus weight percentage of biomass solids to total liquids (consistency) may be as low as 1% or as high as 33% depending on the apparatus chosen and the nature of the biomass.

The temperature of the hydrolysis reaction can be chosen so that the maximum amount of extractable carbohydrates are hydrolyzed and extracted as fermentable sugar (more preferably pentose and/or hexose) from the biomass feedstock while limiting the formation of degradation products.

In some embodiments, a plurality of reactor vessels may be used to carry out the hydrolysis reaction. These vessels may have any design capable of carrying out a hydrolysis reaction. Suitable reactor vessel designs can include, but are not limited to, batch, trickle bed, co-current, counter-current, stirred tank, or fluidized bed reactors. Staging of reactors can be employed to arrive the most economical solution. The remaining biomass feedstock solids may then be optionally separated from the liquid stream to allow more severe processing of the recalcitrant solids or pass directly within the liquid stream to further processing that may include enzymatic hydrolysis, fermentation, extraction, distillation and/or hydrogenation. In another embodiment, a series of reactor vessels may be used with an increasing temperature profile so that a desired sugar fraction is extracted in each vessel. The outlet of each vessel can then be cooled prior to combining the streams, or the streams can be individually fed to the next reaction for conversion.

Suitable reactor designs can include, but are not limited to, a backmixed reactor (e.g., a stirred tank, a bubble column, and/or a jet mixed reactor) may be employed if the viscosity and characteristics of the partially digested bio-based feedstock and liquid reaction media is sufficient to operate in a regime where bio-based feedstock solids are suspended in an excess liquid phase (as opposed to a stacked pile digester). It is also conceivable that a trickle bed reactor could be employed with the biomass present as the stationary phase and a solution of $\alpha$-hydroxysulfonic acid passing over the material.

The treatment reaction product contains fermentable sugar or monosaccharides, such as pentose and/or hexose that is suitable for further processing. The residual alpha-hydroxysulphonic acid can be removed by application of heat and/or vacuum from the fermentable sugar containing product stream to reverse the formation of alpha-hydroxysulphonic acid to its starting material to produce a stream containing fermentable sugar substantially free of the $\alpha$-hydroxysulfonic acid. In particular, the product stream is substantially free of alpha-hydroxysulfonic acid, meaning no more than about 2 wt % is present in the product stream, preferably no more than about 1 wt %, more preferably no more than about 0.2 wt %, most preferably no more than about 0.1 wt % present in the product stream. The temperature and pressure will depend on the particular alpha-hydroxysulphonic acid used and minimization of temperatures employed are desirable to preserve the sugars obtain in treatment reactions. Typically the removal may be conducted at temperatures in the range from about 50° C., preferably from about 80° C., more preferably from 90° C., to about 110° C., up to about 150° C. The pressure may be in the range of from about 0.5 barg, to about 2 barg, more preferably from 0.1 bara to about 1 barg. It can be appreciated by a person skill in the art that the treatment reaction 114 and the removal of the acid 120 can occurred in the same vessel or a different vessel or in a number of different types of vessels depending on the reactor configuration and staging as long as the system is designed so that the reaction is conducted under condition favorable for the formation and maintenance of the alpha-hydroxysulfonic acid and removal favorable for the reverse reaction (as components). As an example, the reaction in the reactor vessel 114 can be operated at approximately 100° C. and a pressure of 4 barg in the presence of alpha-hydroxyethanesulfonic acid and the removal vessel 120 can be operated at approximately 110° C. and a pressure of 0.5 barg. It is further contemplated that the reversion can be favored by the reactive distillation of the formed alpha-hydroxysulfonic acid. In the recycling of the removed acid, optionally additional carbonyl compounds, $SO_2$, and water may be added as necessary. The removed starting material and/or alpha-hydroxysulphonic acid may be condensed and/or scrubbed by contact with water and recycled to the reaction 114.

Thus, a typical reaction mixture contains (a) a biomass containing polysaccharides, (b) at least one $\alpha$-hydroxysulfonic acid, and (c) water. Once some of the biomass is hydrolyzed the reaction mixture contains (a) a biomass containing polysaccharides, (b) at least one $\alpha$-hydroxysulfonic acid (c) water, and (d) at least one fermentable sugar.

In one embodiment, the cellulose containing product stream can further be hydrolyzed by other methods, for example by enzymes to further hydrolyze the biomass to sugar products containing pentose and hexose (e.g., glucose) and fermented to produce alcohols such as disclosed in US Publication No. 2009/0061490 and U.S. Pat. No. 7,781,191 which disclosures are hereby incorporated by reference.

In yet another embodiment, the fermentable sugar can be converted to furfural or hydroxymethylfurfural (HMF) or further fermented to alcohols. Although in some embodiments it may be desirable to minimize the formation of furfurals, if formation of furfurals is desired, the acid containing solution of step (b) may be further heated to a temperature in the range of from 110 to 160° C., more preferably in the range of from 120 to 150° C. to form at least one furfural containing product stream. In one embodiment, the temperature of step (b) is maintained to a temperature of 100° C. or less if it is desirable to obtain minimal furfural in the product stream.

In yet another embodiment, the fermentable sugars can be converted to higher hydrocarbons as a biofuel component using catalytic hydrogenation and condensation techniques rather than further hydrolysis by enzyme and fermentation. Typically the fermentable sugar containing product is contacted with hydrogen in the presence of a hydrogenolysis catalyst to form a plurality of oxygenated intermediates, and then further processing the oxygenated intermediates to produce a fuel blend in one or more processing reactions. In an embodiment, a condensation reaction can be used along with other reactions to generate a fuel blend and may be catalyzed by a catalyst comprising acid or basic functional sites, or both to product a liquid fuel. As used herein, the term "higher hydrocarbons" refers to hydrocarbons having an oxygen to carbon ratio less than at least one component of the biomass feedstock. As used herein the term "hydrocarbon" refers to an organic compound comprising primarily hydrogen and carbon atoms, which is also an unsubstituted hydrocarbon. In certain embodiments, the hydrocarbons of the invention also comprise heteroatoms (e.g., oxygen or sulfur) and thus the term "hydrocarbon" may also include substituted hydrocarbons.

In one such example, the fermentable sugar containing product stream may be further processed to produce mixtures of C4+ compounds useful for biofuels such as described in U.S. Publication No. US2011/0154721 and U.S. patent application Ser. No. 13/106509 filed May 12, 2011 which disclosures are hereby incorporated by reference. As another such example, the fermentable sugar containing product stream may be further processed to produce mixtures of C4+ compounds useful for biofuels such as described in U.S. Publication No. 20080216391 which disclosure is hereby incorporated by reference. The solid feed may also be suitable for use in fast pyrrolysis reactions leading to fuels and chemicals.

The term "fermentable sugar" refers to oligosaccharides and monosaccharides that can be used as a carbon source (e.g., pentoses and hexoses) by a microorganism in a fermentation process. It is contemplated that fermentable sugar may be fermented as described above, but may also be processed by other methods without fermentation to produce fuels as described above. The term "pentose" refers to monosaccharides with five carbon atoms. The term "hexose" refers to monosaccharides with six carbon atoms.

In an enzymatic hydrolysis-fermentation processes the pH of the pretreated feedstock to the enzymatic hydrolysis is typically adjusted so that it is within a range which is optimal for the cellulase enzymes used. Generally, the pH of the pretreated feedstock is adjusted to within a range of about 3.0 to about 7.0, or any pH there between.

The temperature of the treated feedstock is adjusted so that it is within the optimum range for the activity of the cellulase enzymes. Generally, a temperature of about 15° C. to about 100° C., about 20° C. to about 85° C., about 30° C. to about 70° C. preferably or any temperature there between, is suitable for most cellulase enzymes. The cellulase enzymes and the β-glucosidase enzyme are added to the pretreated feedstock, prior to, during, or after the adjustment of the temperature and pH of the aqueous slurry after pretreatment. Preferably the cellulase enzymes and the β-glucosidase enzyme are added to the pretreated lignocellulosic feedstock after the adjustment of the temperature and pH of the slurry.

By the term "cellulase enzymes" or "cellulases," it is meant a mixture of enzymes that hydrolyze cellulose. The mixture may include cellobiohydrolases (CBH), glucobiohydrolases (GBH), endoglucanases (EG), and β-glucosidase. By the term "β-glucosidase", it is meant any enzyme that hydrolyzes the glucose dimer, cellobiose, to glucose. In a non-limiting example, a cellulase mixture may include EG, CBH, and β-glucosidase enzymes.

The enzymatic hydrolysis may also be carried out in the presence of one or more xylanase enzymes. Examples of xylanase enzymes that may also be used for this purpose and include, for examples, xylanase 1, 2 (Xyn1 and Xyn2) and β-xylosidase, which are typically present in cellulase mixtures.

The process can be carried out with any type of cellulase enzymes, regardless of their source. Non-limiting examples of cellulases which may be used include those obtained from fungi of the genera *Aspergillus, Humicola*, and *Trichoderma, Myceliophthora, Chrysosporium* and from bacteria of the genera *Bacillus, Thermobifida* and *Thermotoga*. In some embodiments, the filamentous fungal host cell is an *Acremonium, Aspergillus, Aureobasidium, Bjerkandera, Ceriporiopsis, Chrysosporium, Coprinus, Coriolus, Cryptococcus, Filibasidium, Fusarium, Humicola, Magnaporthe, Mucor, Myceliophthora, Neocallimastix, Neurospora, Paecilomyces, Penicillium, Phanerochaete, Phlebia, Piromyces, Pleurotus, Schizophyllum, Talaromyces, Thermoascus, Thielavia, Tolypocladium, Trametes*, or *Trichoderma* cell.

The cellulase enzyme dosage is chosen to convert the cellulose of the pretreated feedstock to glucose. For example, an appropriate cellulase dosage can be about 0.1 to about 40.0 Filter Paper Unit(s) (FPU or IU) per gram of cellulose, or any amount there between. The term Filter Paper Unit(s) refers to the amount of enzyme required to liberate 2 mg of reducing sugar (e.g., glucose) from a 50 mg piece of Whatman No. 1 filter paper in 1 hour at 50° C. at approximately pH 4.8.

In practice, the hydrolysis may carried out in a hydrolysis system, which may include a series of hydrolysis reactors. The number of hydrolysis reactors in the system depends on the cost of the reactors, the volume of the aqueous slurry, and other factors. The enzymatic hydrolysis with cellulase enzymes produces an aqueous sugar stream (hydrolyzate) comprising glucose, unconverted cellulose, lignin and other sugar components. The hydrolysis may be carried out in two stages (see U.S. Pat. No. 5,536,325, which is incorporated herein by reference), or may be performed in a single stage.

In the fermentation system, the aqueous sugar stream is then fermented by one or more than one fermentation microorganism to produce a fermentation broth comprising the alcohol fermentation product useful as biofuels. In the fermentation system, any one of a number of known microorganisms (for example, yeasts or bacteria) may be used to convert sugar to ethanol or other alcohol fermentation products. The microorganisms convert sugars, including, but not limited to glucose, mannose and galactose present in the clarified sugar solution to a fermentation product.

Many known microorganisms can be used in the present process to produce the desired alcohol for use in biofuels. *Clostridia, Escherichia coli (E. coli)* and recombinant strains of *E. coli*, genetically modified strain of *Zymomonas mobilis* such as described in US2003/0162271, 60/847,813 and 60/847,856 (which disclosures are herein incorporated by reference) are some examples of such bacteria. The microorganisms may further be a yeast or a filamentous fungus of a genus *Saccharomyces, Kluyveromyces, Candida, Pichia, Schizosaccharomyces, Hansenula, Kloeckera, Schwanniomyces, Yarrowia, Aspergillus, Trichoderma, Humicola, Acremonium, Fusarium*, and *Penicillium*. The fermentation may also be performed with recombinant yeast engineered to ferment both hexose and pentose sugars to ethanol. Recombinant yeasts that can ferment one or both of the pentose sugars xylose and arabinose to ethanol are described in U.S. Pat. No. 5,789,210, U.S. Pat. No. 6,475,768, European Patent EP 1,727,890, European Patent EPI 863,901 and WO 2006/096130 which disclosures are herein incorporated by reference. Xylose utilization can be mediated by the xylose reductase/xylitol dehydrogenase pathway (for example, WO9742307 A1 19971113 and WO9513362 A1 19950518) or the xylose isomerase pathway (for example, WO2007028811 or WO2009109631) It is also contemplated that the fermentation organism may also produce fatty alcohols, for example, as described in WO 2008/119082 and PCT/US07/011,923 which disclosure is herein incorporated by reference. In another embodiment, the fermentation may be performed by yeast capable of fermenting predominantly C6 sugars for example by using commercially available strains such as *Thermosacc* and *Superstart*.

Preferably, the fermentation is performed at or near the temperature and pH optima of the fermentation microorganism. For example, the temperature may be from about 25° to about 55° C., or any amount there between. The dose of the fermentation microorganism will depend on other factors, such as the activity of the fermentation microorganism, the desired fermentation time, the volume of the reactor and other parameters. It will be appreciated that these parameters may be adjusted as desired by one of skill in the art to achieve optimal fermentation conditions.

The fermentation may be conducted in batch, continuous or fed-batch modes, with or without agitation. The fermentation system may employ a series of fermentation reactors.

In some embodiment, the hydrolysis system and fermentation system may be conducted in the same vessel. In one embodiment, the hydrolysis can be partially completed and the partially hydrolyzed stream may be fermented. In one embodiment, a simultaneous saccharification and fermentation (SSF) process where hydrolysis system may be run until the final percent solids target is met and then the hydrolyzed biomass may be transferred to a fermentation system.

The fermentation system produces an alcohol stream preferably containing at least one alcohol having 2 to 18 carbon atoms. In the recovery system, when the product to be recovered in the alcohol stream is a distillable alcohol, such as ethanol, the alcohol can be recovered by distillation in a manner known to separate such alcohol from an aqueous stream. If the product to be recovered in the alcohol stream is not a distillable alcohol, such as fatty alcohols, the alcohol can be recovered by removal of alcohols as solids or as oils from the fermentation vessel, thus separating from the aqueous effluent stream.

While the invention is susceptible to various modifications and alternative forms, specific embodiments thereof are shown by way of examples herein described in detail. It should be understood, that the detailed description thereto are not intended to limit the invention to the particular form disclosed, but on the contrary, the intention is to cover all modifications, equivalents and alternatives falling within the spirit and scope of the present invention as defined by the appended claims. The present invention will be illustrated by the following illustrative embodiment, which is provided for illustration only and is not to be construed as limiting the claimed invention in any way.

Illustrative Embodiments

General Methods and Materials

In the examples, the aldehyde or aldehyde precursors were obtained from Sigma-Aldrich Co.

Whole bagasse having the following components analyzed using standard TAPPI methods (T-249, T-222, T-211) and had the following average composition on a dry basis:
Glucan 44.5 wt. %
Xylan 24.6 wt. %
Lignin 23.25 wt. %
Ash 2.79 wt. %
Other 4.86%
Analytical Methods
Determination of Oxygenated Components in Aqueous Layer.

A sample or standard is analyzed by injection into a stream of a mobile phase that flows though a Bio-rad column (Aminex HPX-87H, 300 mm×7.8 mm). The reverse phase HPLC system (Shimadzu) equipped with both RI and UV detectors and the signals are recorded as peaks on a data acquisition and data processing system. The components are quantified using external calibration via a calibration curves based on injection of know concentrations of the target components. Some of the components were calculated by using single point of standard. The reference samples contained 0.5 wt % Glucose, Xylose and Sorbitol in water
HPLC Instrument Conditions:
Column: Bio-Rad Aminex HPX-87H (300 mm×7.8 mm)
Flow Rate: 0.6 ml/minute
Column Oven: 30° C.
Injection Volumn: 10 µl
UV Detector: @320 NM
RI Detector: mode-A; range −100
Run Time: 70 minute
Mobile Phase: 5 mM Sulfuric Acid in water
Sample is either injected directly or diluted with water first, but makes sure there is no particulars. Pass through the 0.2 µm syringe filter, if there is precipitation in the sample or diluted sample. Samples were analyzed for Glucose, Xylose, Cellobiose, Sorbitol, Formic Acid, Acetic Acid, Arabinose, hydroxymethyl furfural, and Furfural content.

EXAMPLES

General Procedure for the Formation of α-Hydroxysulfonic Acids.

Aldehydes and ketones will readily react with sulfur dioxide in water to form α-hydroxy sulfonic acids according to the equation 1 above. These reactions are generally rapid and somewhat exothermic. The order of addition ($SO_2$ to carbonyl or carbonyl to $SO_2$) did not seem to affect the outcome of the reaction. If the carbonyl is capable of aldol reactions, preparation of concentrated mixtures (>30% wt.) are best conducted at temperatures below ambient to minimize side reactions. We have found it beneficial to track the course of the reaction using in situ Infrared Spectroscopy (ISIR) employing probes capable of being inserted into pressure reaction vessels or systems. There are numerous manufacturers of such systems such as Mettler Toledo Autochem's Sentinal probe. In addition to being able to see the starting materials: water (1640 $cm^{-1}$), carbonyl (from approx. 1750 $cm^{-1}$ to 1650 $cm^{-1}$ depending on the organic carbonyl structure) and $SO_2$ (1331 $cm^{-1}$), the formation of the α-hydroxysulfonic acid is accompanied by the formation of characteristic bands of the $SO_3^-$ group (broad band around 1200 $cm^{-1}$) and the stretches of the α-hydroxy group (single to multiple bands around 1125 $cm^{-1}$). In addition to monitoring the formation of the α-hydroxy sulfonic acid, the relative position of the equilibrium at any temperature and pressure can be readily assessed by the relative peak heights of the starting components and the acid complex. The definitive presence of the α-hydroxy sulfonic acid under biomass hydrolysis conditions can also be confirmed with the ISIR and it is possible to monitor the growth of sugars in the reaction mixture by monitoring the appropriate IR bands.

Example 1

Formation of 40% wt. α-Hydroxyethane Sulfonic Acid from Acetaldehyde.

Into a 12 ounce Lab-Crest Pressure Reaction Vessel (Fischer-Porter bottle) was placed 260 grams of nitrogen degassed water. To this was added 56.4 grams of acetaldehyde via syringe with stirring. The acetaldehyde/water mixture showed no apparent vapor pressure. The contents of the Fischer-Porter bottle were transferred into a chilled 600 ml C276 steel reactor fitted with SiComp IR optics. A single ended Hoke vessel was charged with 81.9 grams of sulfur dioxide was inverted and connected to the top of the reactor. The $SO_2$ was added to the reaction system in a single portion. The pressure in the reactor spiked to approximately 3 bar and then rapidly dropped to atmospheric pressure as the ISIR indicated the appearance and then rapid consumption of the $SO_2$. The temperature of the reaction mixture rose approximately 31° C. during the formation of the acid (from 14° C. to 45° C.). ISIR and reaction pressure indicated the reaction was complete in approximately 10 minutes. The final solution showed an infrared spectrum with the following characteristics: a broad band centered about 1175 $cm^{-1}$ and two sharp bands at 1038 $cm^{-1}$ and 1015 $cm^{-1}$. The reactor was purged twice by pressurization with nitrogen to 3 bar and then venting. This produced 397 grams of a stable solution of 40% wt. α-hydroxyethane sulfonic acid with no residual acetaldehyde or $SO_2$. A sample of this material was dissolved in $d_6$-DMSO and analyzed by $^{13}C$ NMR, this revealed two carbon absorbances at 81.4, and 18.9 ppm corresponding the two carbons of α-hydroxyethane sulfonic acid with no other organic impurities to the limit of detection (about 800:1).

Example 2

Formation of 41% wt. α-Hydroxymethane Sulfonic Acid from Trioxane.

Into a 600 ml C276 steel reactor fitted with SiComp IR optics was added 280.29 grams of nitrogen degasses water and 46.88 grams of trioxane. The reactor was sealed and purged with nitrogen and a single ended Hoke vessel was charged with 101.26 grams of sulfur dioxide was inverted and connected to the top of the reactor. The $SO_2$ was added to the reaction system in a single portion. There was no apparent reaction and the ISIR revealed IR bands consistent only with the starting components. This is consistent with the fact that trioxane must be heated to generate the carbonyl formaldehyde. The reaction mixture was heated to 105° C. with stirring, the pressure of the mixture rising to 8.3 bar. On approaching the target temperature an exothermic reaction took place, the pressure in the reactor dropped to 4.1 bar due to consumption of $SO_2$ and the temperature rose from 105° C. to 124° C. ISIR and reaction pressure indicated the reaction was complete in approximately 10 minutes once initiated. The final solution showed an infrared spectrum with the following characteristics: a broad band centered about 1185 $cm^{-1}$ and a single sharp band at 1034 $cm^{-1}$ (a small peak due to excess $SO_2$ at 1331 $cm^{-1}$ was noted). Once the reactor was cooled to room temperature and purged twice by pressurization with nitrogen to 3 bar and then venting, this produced 423.92 grams of a stable solution of 41% wt. α-hydroxymethane sulfonic acid with no residual formaldehyde or $SO_2$.

Example 3

Formation of 40% wt. α-Hydroxymethane Sulfonic Acid from Paraformaldehdye.

Into a sealed and nitrogen sparged 600 ml autoclave equipped with a SiComp IR probe was charged 285.02 grams (ml) of nitrogen sparged DI water and 49.31 grams of Paraformaldehyde (Aldrich 158127, batch MKAA1858, 95%). The autoclave was sealed, sparged with nitrogen and stirred. ISIR showed water and dissolved paraformaldehyde. A Hoke vessel containing 100.01 grams of sulfur dioxide is inverted, attached to the reactor as a "blowcase injector" and the sulfur dioxide injected into the reactor through a ball valve. ISIR immediately showed a growing $SO_2$ band at 1331 $cm^{-1}$. The pressure in the reactor rises to 3.31 barg. A slow reaction initiates with bands indicative of α-hydroxymethane sulfonic acid growing in. The reaction accelerates as an reaction exotherm occurs, the temperature of the reactor rises from 25° C. to 39° C. as the pressure of the reactor falls to 0.5 barg. The ISIR shows the rapid growth of the α-hydroxymethane sulfonic acid and $SO_2$ disappears from the reaction mixture. The reactor is allowed to cool to room temperature and purged twice by pressurization with nitrogen to 3 bar and then venting, this produced 430 grams of a 40% wt. α-hydroxymethane sulfonic acid solution.

Example 4

Formation of 10% wt. α-Hydroxysulfonic Acid from 2-Furaldehyde.

Into a sealed and nitrogen sparged 600 ml autoclave equipped with a SiComp IR probe and heating band was charged 374.92 grams of nitrogen sparged DI water and 22.59 grams of furfural (Aldrich batch MKBC2892). A Hoke vessel containing 15.25 grams of sulfur dioxide (234 mmoles) is inverted and attached to the reactor as a "blowcase injector". The reactor is closed and sparged 3 times with nitrogen gas. The stirrer is started and ISIR acquisition initiated. The sulfur dioxide is injected to the reactor through a ball valve the pressure in the reactor briefly spikes to 2.25 barg and $SO_2$ in the reaction mixture is noted in the ISIR spectrum. The formation of the α-hydroxymethanesulfonic acid was immediately noted in the ISIR by the growth of a broad band at 1198 $cm^{-1}$ with a shoulder peak at 1154 $cm^{-1}$ and two sharp bands at 1034 $cm^{-1}$ and 1015 $cm^{-1}$. The temperature of the reactor rises from 26 to 29° C. This yields approximately 410 grams of a 10% wt. α-hydroxysulfonic acid solution.

Example 5

Formation of 20% wt. Bis-α-Hydroxymethane Sulfonic Acid.

Into a 600 ml C276 reactor fitted with IR optics was loaded 366.36 grams of nitrogen sparged water and 63.45 grams of 40% wt. glyoxal solution. The reactor was sealed, stirring started and purged twice with nitrogen. A Hoke vessel containing 58.56 grams of sulfur dioxide is inverted, attached to the reactor as a "blowcase injector" and the sulfur dioxide injected into the reactor through a ball valve. ISIR immediately showed a growing $SO_2$ band at 1331 $cm^{-1}$. The pressure in the reactor rises. A slow reaction initiates with bands indicative of bis-α-hydroxymethane sulfonic acid growing in (broad peak at 1202 $cm^{-1}$ and a sharp peak at 1030 $cm^{-1}$). The reaction accelerates as a reaction exotherm occurs, the temperature of the reactor rises from 23° C. to 29° C. as the pressure of the reactor falls. The ISIR shows the slow growth of the α-hydroxymethane sulfonic acid and $SO_2$ gradually disappears from the reaction mixture. The reactor was heated to 50° C. and held there for 30 minutes to complete the reaction. The reactor is allowed to cool to room temperature and the pressure in the reactor has fallen to atmospheric. There is only a trace of $SO_2$ in the ISIR spectrum (slight excess employed). This was purged twice by pressurization with nitrogen to 3 bar and then venting to remove excess $SO_2$, the procedure produced 485 grams of a 20% wt. bis-α-hydroxymethane sulfonic acid solution. Note that commercial glyoxal solutions contain very little free carbonyl, the bulk of the material tied up as hydrates and oligomers, this shows that the formation of the α-hydroxysulfonic acid effectively shifts this equilibrium at low temperatures to completely revert all of the incipient carbonyl into complexed bis-acid.

Examples 6-27

Hydrolysis of Biomass with α-Hydroxymethane Sulfonic Acid Solutions, Examples 6 through 27

This is the general procedure for examples 6 through 27 the conditions utilized and the result are in Table 1, the type of acid employed in listed in column B, concentration in column C, the target temperature in column D, and the time at reaction temperature in column E. Into a 300 ml autoclave equipped with a DiComp IR probe place approximately 12 grams of chopped, dried bagasse. To this add 100 grams of a α-hydroxyethane sulfonic acid solution, by gently pouring this material over the bagasse in the reactor. Seal the reactor fitted with heating bands and stir the mixture for 5 minutes, then the system is purged lightly three times with nitrogen. The reactor now contains a mixture comprising approximately 10.7% wt. biomass in contact with α-hydroxy sulfonic acid solution (112 grams total solution).

The reaction mixture is stirred (1000 to 1500 rpm as noted in column I using a 45° downpitch impeller) and begin acquisition of IR spectra. The reaction mixture is then heated to the target temperature and held for the stated period of time. The heating is discontinued and the reactor cooled to room temperature using a flow of compressed air. The reactor was vented and then purged with a slow nitrogen stream for a few minutes to eliminate any sulfur dioxide in the gas cap. The reactor was opened and the contents filtered through a medium glass frit funnel using a vacuum aspirator. The reactor was rinsed with three separate 25 ml portions of water (noting weight on all rinses), the rinses being used to complete the transfer of solids and rinse the solids in the funnel. In order to completely rinse the solids in the funnel, it was necessary to turn off the vacuum, add the water, suspend the solids by manual agitation and then reestablish the vacuum to filter. The cumulative weight of the filtrate and rinses was obtained. The filtrate was then analyzed by HPLC and the recovery of materials from the biomass calculated by comparison to the amount of the precursors in present in the biomass. The solids were dried to a constant weight in air.

Figure 4:
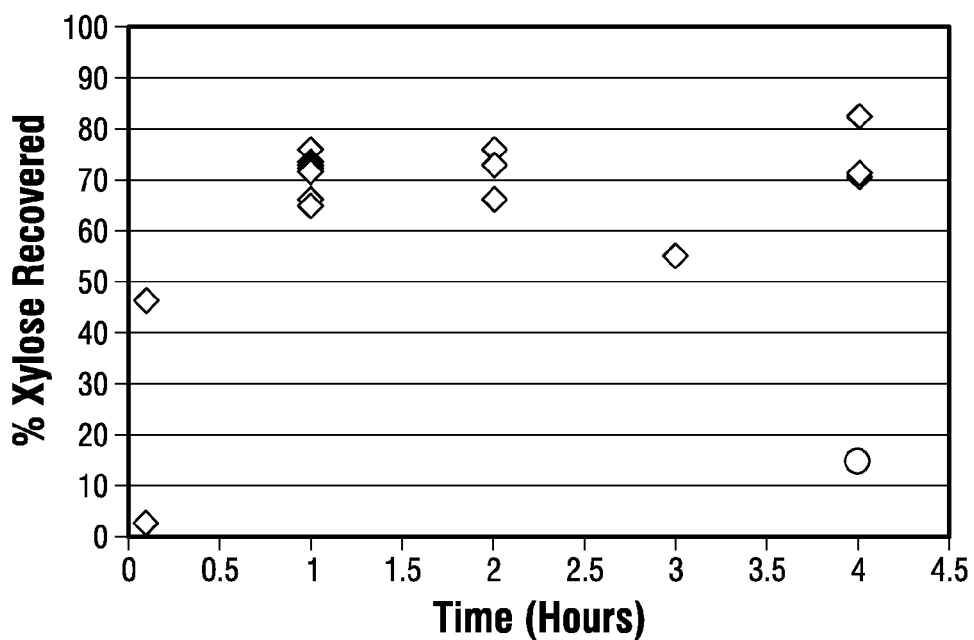
FIG. 4 shows the xylose recovered with time in the presence of 10 wt. % alpha-hydroxyethanesulfonic acid and 10.7% Biomass compared with a comparative example with only biomass water and $SO_2$
Figure 5:
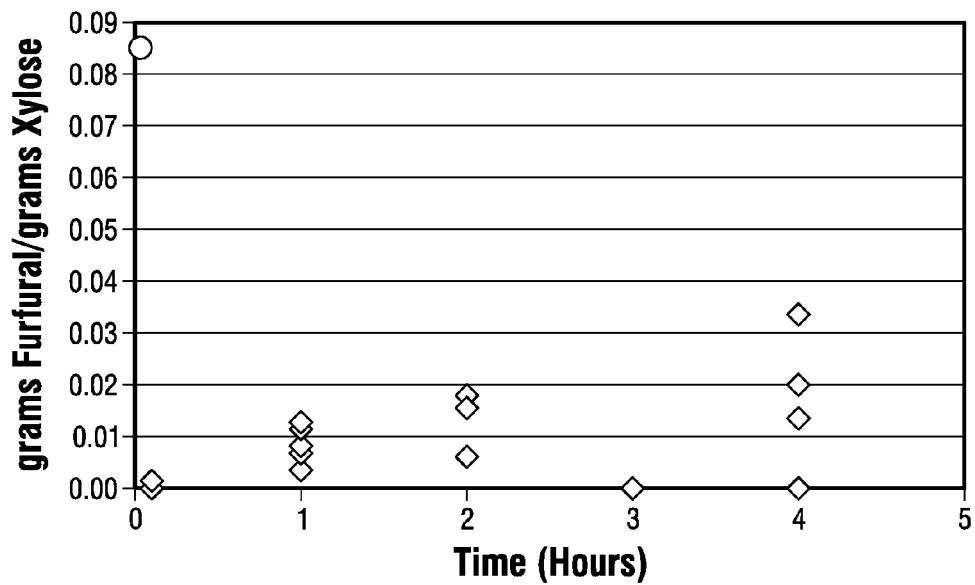
FIG. 5 shows the grams Furfural/grams of Xylose produced with time in the presence of α-hydroxysulfonic acid and 10 wt. % Bagasse.

Xylose recovered with time and grams furfural/grams of xylose produced with time for Examples 10 to 20 are shown in FIGS. 4 and 5, respectively. For comparison, the furfural make of a traditional high temperature dilute sulfuric acid pretreatment as described in U.S. Patent Application Publication no. US2010/0184151 is shown as circle in FIG. 5.

purged lightly three times with nitrogen. Invert a single ended Hoke vessel containing 5.44 grams of sulfur dioxide (84.9 mmoles) and connect this to the reactor. The Hoke vessel was opened to the reactor and the $SO_2$ added in a single portion. Its presence in the reaction mixture was noted by a strong sharp band in the ISIR characteristic of $SO_2$ at 1331 $cm^{-1}$. The reactor now contains a mixture comprising approximately 10.71% wt. biomass in contact with an $SO_2$/water mixture at 0.61 barg and 25° C. The reaction mixture was heated to 90° C. and held there for 4 hours. The pressure at 90° C. was 3.13 barg. The heating is discontinued and the reactor cooled to room temperature using a flow of compressed air. The reactor was vented and then purged with a slow nitrogen stream for a few minutes to eliminate any sulfur dioxide in the gas cap. The reactor was opened and the contents filtered through a medium glass frit funnel using a vacuum aspirator. The reactor was rinsed with three separate 25 ml portions of water to complete the transfer of solids and rinse the solids in the funnel. The cumulative weight of the filtrate and rinses was obtained. The filtrate was then analyzed by HPLC and the recovery of materials from the biomass calculated by comparison to the amount of the precursors in present in the biomass. The solids were are dried to a constant weight in air. Results are reported in Table 2.

Reaction with Acetaldehyde, $SO_2$ and Water (α-Hydroxyethanesulfonic Acid):

Into a 300 ml autoclave equipped with a DiComp IR probe was placed 12.03 grams of chopped, dried bagasse. To this

TABLE 1

| A Example | B Acid | C Acid Concentration (% Wt) | D Reaction Temperature (° C.) | E Time at Temperature (hr) | F % Xylose Recovery in Filtrate* | G % Glucose Recovery in Filtrate** | H % Furfural Recovery in Filtrate* | I Stirrer Speed |
|---|---|---|---|---|---|---|---|---|
| 6 | α-hydroxyethane sulfonic acid | 10 | 80 | 22.5 | 55.43 | 3.16 | 0.37 | 1000 rpm |
| 7 | α-hydroxyethane sulfonic acid | 10 | 80 | 24 | 55.26 | 4.24 | 0.51 | 1000 rpm |
| 8 | α-hydroxyethane sulfonic acid | 40 | 80 | 5 | 55.97 | 3.84 | 0.60 | 1000 rpm |
| 9 | α-hydroxyethane sulfonic acid | <1 | 80 | 26.5 | 15.09 | 0.59 | ND | 1000 rpm |
| 10 | α-hydroxyethane sulfonic acid | 10 | 80 | 0.1*** | 2.56 | 0.41 | ND | 1000 rpm |
| 11 | α-hydroxyethane sulfonic acid | 10 | 80 | 3.0 | 54.89 | 1.55 | ND | 1000 rpm |
| 12 | α-hydroxyethane sulfonic acid | 10 | 100 | 0.1*** | 46.17 | 1.28 | 0.073 | 1000 rpm |
| 13 | α-hydroxyethane sulfonic acid | 10 | 90 | 2 | 66.16 | 3.16 | 0.47 | 1000 rpm |
| 14 | α-hydroxyethane sulfonic acid | 10 | 100 | 1 | 65.02 | 4.32 | 0.27 | 1000 rpm |
| 15 | α-hydroxyethane sulfonic acid | 10 | 100 | 2 | 75.60 | 6.51 | 1.63 | 1000 rpm |
| 16 | α-hydroxyethane sulfonic acid | 10 | 100 | 4 | 82.7 | 7.79 | 3.33 | 1000 rpm |
| 17 | α-hydroxyethane sulfonic acid | 10 | 90 | 1 | 66.12 | 3.77 | 0.54 | 1500 rpm |
| 18 | α-hydroxyethane sulfonic acid | 20 | 90 | 2 | 72.9 | 5.65 | 1.36 | 1500 rpm |
| 19 | α-hydroxyethane sulfonic acid | 10 | 90 | 4 | 70.68 | 5.50 | 1.70 | 1500 rpm |
| 20 | α-hydroxyethane sulfonic acid | 20 | 100 | 1 | 73.46 | 6.20 | 1.02 | 1500 rpm |
| 21 | α-hydroxymethane sulfonic acid | 10 | 80 | 22 | 44.44 | 4.14 | 0.67 | 1000 rpm |
| 22 | α-hydroxymethane sulfonic acid | 10.25 | 120 | 3.3 | 55.48 | 12.58 | 9.37 | 1000 rpm |
| 23 | α-hydroxymethane sulfonic acid | 41 | 80 | 25.5 | 15.33 | 12.43 | 0.82 | 1000 rpm |
| 24 | α-hydroxymethane sulfonic acid | 41 | 80 | 0.1*** | 67.12 | 4.66 | 0.88 | 1000 rpm |
| 25 | α-hydroxymethane sulfonic acid | 10 | 80 | 0.1*** | 8.61 | 0.48 | ND | 1000 rpm |
| 26 | Bis-α-dihydroxymethane sulfonic acid | 10.6 | 80 | 2 | 53.85 | 1.57 | ND | 1000 rpm |
| 27 | Bis-α-dihydroxymethane sulfonic acid | 10.6 | 80 | 21 | 73.16 | 5.42 | ND | 1000 rpm |

*Based on % w xylan in the feed (0.88 grams of xylan produces 1.0 grams of xylose theoretical)
**Based on % w glucan in the feed
***Reactor was brought to the designated temperature and shutdown immediately Examples 28 and 29

Biomass Treatment with α-Hydroxyethane Sulfonic Acid vs. $SO_2$/Water

Reaction with $SO_2$ and Water (No Carbonyl Compound, Therefore No α-Hydroxysulfonic Acid):

Into a 300 ml autoclave equipped with a DiComp IR probe was place 12 grams of chopped, dried bagasse. To this was add 95 grams of water (5277 mmoles) by gently pouring over the bagasse in the reactor. Seal the reactor fitted with heating bands and start the stirrer (1500 rpm), then the system is add 100 grams of a 10% α-hydroxyethane sulfonic acid solution (this is comprised of approximately 91.26 grams of water, 5.07 grams of $SO_2$ and 3.5 grams of acetaldehyde), by gently pouring this material over the bagasse in the reactor. The reaction mixture was heated to 90° C. and held there for 4 hours. The pressure at 90° C. was 1.36 barg and ISIR confirmed the presence of α-hydroxyethane sulfonic acid during the reaction. The heating is discontinued and the reactor cooled to room temperature using a flow of compressed air. The reactor was vented and then purged with a slow nitrogen stream for a few minutes to eliminate any sulfur dioxide in the gas cap. The reactor was opened and the contents filtered through a medium glass frit funnel using a vacuum aspirator. The reactor was rinsed with three separate 25 ml portions of water to complete the transfer of solids and rinse the solids in the funnel. The cumulative weight of the filtrate and rinses was obtained. The filtrate was then analyzed by HPLC and the recovery of materials from the biomass calculated by comparison to the amount of the precursors in present in the biomass. The solids were are dried to a constant weight in air. Results are shown in Table 2.

From the substantial absence of xylan to xylose conversion without the addition of acetaldehyde (since formation of α-hydroxysulonic acid requires a carbonyl, this represents an absence of α-hydroxysulfonic acid, but all other components are present), this illustrates that the α-hydroxysulfonic acid is responsible for hydrolysis activity. The results of comparative example 28 and the example 29 is shown in FIG. 4. Example 28 is shown as circle in FIG. 4.

TABLE 2

| Example | Acid | % Xylose Recovery in Filtrate* | % Glucose Recovery in Filtrate** | % Furfural Recovery in Filtrate*** |
|---|---|---|---|---|
| 28 | $SO_2$ only-no aldehyde | 14.71 | 0.55 | ND |
| 29 | α-hydroxyethane sulfonic acid | 71.11 | 5.03 | 1.16 |

*Based on % w xylan in the feed (x grams of xylan produces y grams of Xylose theoretical)
**Based on % w cellulose and % w cellubiose in the feed
***Based on % w xylan in the feed It can be seen from the results that the formation of α-hydroxyethane sulfonic acid with a carbonyl compound is necessary in obtaining the excellent fermentable sugar recovery in the invention process.

Example 30

Hydrolysis of Biomass with α-Hydroxyethane Sulfonic Acid Followed by Reversion of the Acid Via Depressurization and Distillation of Components.

Figure 6:
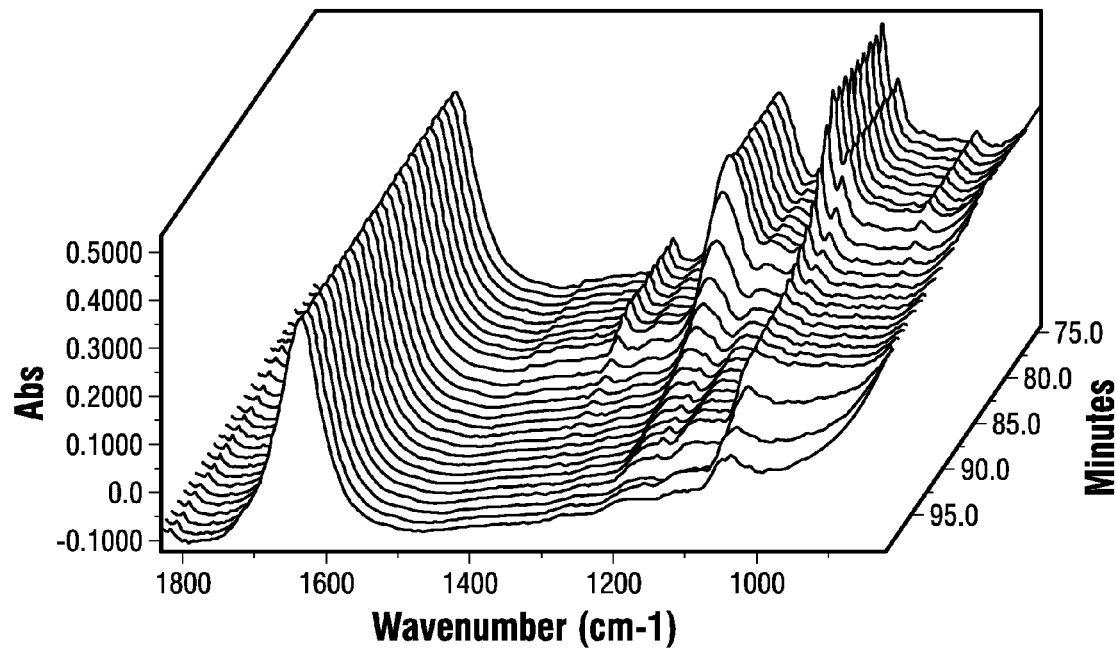
FIG. 6 shows a three dimensional IR plot, plotting individual IR spectra over time from the treatment of bagasse with 20% wt. α-hydroxyethane sulfonic acid at 100° C. followed by reversion of the acid.

Into 20 grams of nitrogen degassed water was added 50 grams of 40% wt. α-hydroxyethane sulfonic acid solution to give 100 grams of a 20% α-hydroxyethane sulfonic acid solution. This was poured gently over 12.03 grams of chopped, dried bagasse in a 300 ml autoclave equipped with a DiComp IR probe. The reactor was sealed and the mixture stirred for 5 minutes, then pressurized to 6.8 barg with nitrogen to test for pressure integrity. After venting the reactor to atmospheric pressure the unit was closed and heated to 100° C. in 18 minutes. The reaction mixture was held 100° C. for 1 hour. The pressure at 100° C. was 4.3 barg. Spectral evidence shows the presence of α-hydroxyethane sulfonic acid as well as $SO_2$ and acetaldehyde. Approximately 75 mol % of the charged acid is in the acid form measured by variable temperature NMR under these conditions and that the acid level is stable. During the heating period a tared 75 ml Hoke vessel fitted as a cold trap is connected to the reactor and cooled with crushed dry ice. At the end of the 1 hour heating period the valve opening to the gas cap and leading to the cold trap is slowly opened and the pressure in the reactor rapidly decreases. A view of the ISIR spectra in a waterfall plot with time is shown in FIG. 6, it reveals a corresponding drop in the $SO_2$ and acetaldehyde in solution. The IR bands for α-hydroxyethane sulfonic acid fall off and are virtually non-existent within 15 minutes of venting, this is shown in the FIG. 6. After 20 minutes of venting both the reactor and the cold trap are sealed. The reactor is pressurized with 2.7 barg of nitrogen and allowed to cool room temperature. The reactor was opened and the contents filtered through a medium glass frit funnel using a vacuum aspirator. The reactor was rinsed with three separate 25 ml portions of water to complete the transfer of solids and rinse the solids in the funnel. The cumulative weight of the filtrate and rinses was obtained. The filtrate was then analyzed by HPLC and the recovery of materials from the biomass calculated by comparison to the amount of the precursors in present in the biomass. These results are represented as example 20 in Table 1. The solids were are dried to a constant weight in air.

The vapor trap is allowed to warm to room temperature and 20.31 grams of material was captured in the trap. IR analysis revealed the trap to contain α-hydroxyethane sulfonic acid, $SO_2$, and acetaldehyde. There was insufficient water in the trap for the acid to completely reform. This shows the reversible and recyclable nature of the acid as well and the concurrent successful acid treatment of the biomass.

Examples 31-33

Hydrolysis of Biomass with α-Hydroxyethane Sulfonic Acid Formed In Situ with and without Excess $SO_2$.

To approximately 84 grams of chilled distilled water in a tared bottle was added 7.14 grams of acetaldehyde which was mixed to dissolve. The bottle was capped and allowed to warm to room temperature. The bottle was weighed to confirm precise amounts of acetaldehyde dissolved in the water. Approximately 90 grams of this solution was poured over 12 grams of chopped dried bagasse in a 300 ml autoclave equipped with a DiComp IR probe. The reactor was sealed and pressurized with nitrogen to 6.8 barg to assure pressure integrity. A single ended Hoke vessel with a closed ball valve containing the required amount of sulfur dioxide was inverted and connected to the reactor. After the mixture had stirred for ten minutes the IR spectrum revealed the presence of water and acetaldehyde, but none of the α-hydroxysulfonic acid. The sulfur dioxide is injected into the stirred reactor at 24° C. in a single portion. This was accompanied by an immediate exotherm and the ISIR indicated rapid formation of α-hydroxyethane sulfonic acid. Fourteen minutes after the addition of $SO_2$, there is no observable change in the composition of the reaction mixture by ISIR and the temperature of the mixture had risen to about 32° C. Heat was then applied to the reactor to raise the temperature to 100° C. The reaction was held at the temperature for one hour. During the temperature rise and while at temperature, $SO_2$ and acetaldehyde are observed to be present in the reaction mixture by ISIR, but a substantial portion of the α-hydroxyethane sulfonic acid remains. IR spectra of the reaction mixture also shows that the addition of excess $SO_2$ in the reaction mixture results in an increased amount of the α-hydroxy sulfonic acid at elevated temperatures. The hydrolysis reaction is allowed to continue for one hour at 100° C. and then the acid is reversed when the gas cap is released into a trap comprised of 70 grams of water in a 250 ml three neck round bottom flask which is fitted with a dry ice acetone condensor. The outlet of the condenser is routed to a caustic trap to prevent the passage of any $SO_2$ to the atmosphere. The water in the flask is agitated with a stir bar and the flask is cooled in a wet ice bath. The vent from the reactor is directed immediately above the ice cold water. This slows to a stop and a liquid can be seen to condense from the dry ice condenser, when this ceases and the pressure in the reactor is <0.2 barg, the temperature of the reactor was raised to 110° C. and venting was continued for an additional 15 minutes. The vent valve on the reactor is closed and the reactor cooled to ambient. The trap is allowed to warm to room temperature. The trap was weighed to obtain material balance on the vaporization and the liquid analyzed by IR and $^{13}C$, $^1H$ NMR analysis which is used to calculate the percentage recovery of acid employed. The cooled reactor was opened and the contents filtered through a medium glass frit funnel using a vacuum aspirator to draw the liquid through the funnel. The reactor was rinsed with three separate 25 ml portions of water to complete the transfer of solids and rinse the solids in the funnel. The cumulative weight of the filtrate and rinses was obtained and the filtrate was analysis by HPLC. The residual solid was dried to a constant weight in the air.

Example 34

Formation of α-Hydroxyethane Sulfonic Acid from Acetaldehyde-Ethanol Mixture

The reaction in Example 34 was carried out in a similar manner to Example 31 except the acetaldehyde source was a 1:1 mixture of acetaldehyde and ethanol mixture. This simulates the intermediate stream produced via oxidation of ethanol to acetaldehyde. The result is shown in Table 3.

these vials is added approximately 0.3 grams of biomass substrate, 7.7 grams of DI water, 0.5 grams of a pH 5 sodium acetate buffer. This is adjusted with 1 normal hydrochloric acid to a pH of approximately 5.0. The vials are placed into a 52° C. stirring/heating block set at 800 rpm. The mixtures were allowed to stir for 30 minutes and then individually removed from the block and 500 μL of GC 220 enzyme obtained from Genencor was added. This was allowed to hydrolyze for a total of 72 hours with aliquots removed for glucose and sucrose analysis at indicated hours elapsed time. This procedure was used to hydrolyze the bagasse treated with α-hydroxyethane sulfonic acid and a-hydroxymethane sulfonic acid, examples 16, 17, 18, 19, 20, and 29 in Table 1 and Table 2. The exact amounts of materials used and the

TABLE 3

| Example | Acid | Acid Concentration (% Wt) | % Xylose Recovery in Filtrate* | % Glucose Recovery in Filtrate** | % Furfural Recovery in Filtrate* | Stirrer Speed |
|---|---|---|---|---|---|---|
| 31 | α-hydroxyethane sulfonic acid (In situ 1:1 SO$_2$:AA) | 20 | 72.78 | 6.47 | 0.68 | 1500 rpm |
| 32 | α-hydroxyethane sulfonic acid (In situ 1.15:1 SO$_2$:AA) | 20 | 76.07 | 7.15 | 0.75 | 1500 rpm |
| 33 | α-hydroxyethane sulfonic acid (In situ 1:1 SO$_2$:AA) | 20 | 75.90 | 7.55 | 0.61 | 1500 rpm |
| 34 | α-hydroxyethane sulfonic acid (Ethanol/AA/SO$_2$) | 20 | 71.80 | 6.94 | — | 1500 rpm |

*Based on % w xylan in the feed (x grams of xylan produces y grams of Xylose theoretical)
**Based on % w glucan in the feed Examples 35-41

Enzymatic Hydrolysis of Biomass Treated with α-Hydroxysulfonic Acids

Enzymatic hydrolysis reactions were carried out in thick walled conical bottom 10 ml vials with magnetic stirring. To results are listed in Table 4. It can be seen that material treated with the α-hydroxymethane sulfonic acid provide improved access to the contained cellulose by the enzymes. As shown in Table 4, compared to untreated bagasse, α-hydroxy sulfonic acid treated bagasse allows substantially complete conversion to glucose.

TABLE 4

| | Example | | | | | | |
|---|---|---|---|---|---|---|---|
| | 35 | 36 | 37 | 38 | 39 | 40 | 41 |
| Biomass source (Ex. #) | 16 | 17 | 18 | 19 | 20 | 29 | Untreated Feed |
| Sample Weight (g)* | 0.3025 | 0.3034 | 0.3008 | 0.3050 | 0.3044 | 0.3050 | 0.3028 |
| DI Water initial (ml) | 7.7733 | 7.7470 | 7.7451 | 7.7700 | 7.7700 | 7.8056 | 7.7674 |
| Acetate solution 23.01 g/250 g total | 0.5165 | 0.5178 | 0.5204 | 0.5100 | 0.5100 | 0.5161 | 0.5098 |
| DI Water final (ml) | 1.0064 | 1.0106 | 1.0101 | 1.0100 | 1.0100 | 1.0078 | 1.0325 |
| Enzyme package (ml) | 0.5580 | 0.5140 | 0.5105 | 0.5371 | 0.5560 | 0.5518 | 0.5409 |
| Total | 10.1567 | 10.0928 | 10.0869 | 10.1321 | 10.1504 | 10.1863 | 10.1534 |
| Glucose g/L | | | | | | | |
| 1 hr | 0.380 | 0.550 | 0.710 | | | 0.550 | |
| 2 hr | 0.510 | 0.710 | 0.780 | 0.705 | 0.942 | 0.710 | |
| 4 hr | 0.670 | 0.840 | 0.940 | | | 0.820 | |
| 24 hr | 1.500 | 1.420 | 1.630 | 1.43 | 1.74 | 1.450 | |
| 48 hr | 1.690 | 1.600 | 1.710 | 1.68 | | 1.810 | |
| 65 hr | | | | | | | |
| 72 hr | 1.800 | 1.610 | 1.760 | 1.85 | 1.84 | 1.860 | 0.42 |
| Glucose Recovery (%)** | | | | | | | |
| 1 hr | | | | | | | |
| 2 hr | | | | | 38 | 52 | |
| 4 hr | | | | | | | |
| 24 hr | | | | | 78 | 95 | |
| 48 hr | | | | | 91 | | |

TABLE 4-continued

| | Example | | | | | | |
|---|---|---|---|---|---|---|---|
| | 35 | 36 | 37 | 38 | 39 | 40 | 41 |
| 65 hr | | | | | | | |
| 72 hr | | | | 100 | 101 | | 23 |

*Moisture content taken into account for the analysis
**Glucose Recovery basis glucan/cellulose in the feed

Examples 42-45

Long Term Stability Tests of α-Hydroxyethane Sulfonic Acid Followed by Reversal and Overhead Recovery of the α-Hydroxyethane Sulfonic Acid.

Into a 2 liter C276 Parr reactor fitted with in situ IR optics was added 1000 grams of α-hydroxyethane sulfonic acid (HESA, approx. 5 or 10% wt.) prepared by the dilution of a 40% wt. stock solution of the acid with deionized water. Target concentration was confirmed by proton NMR of the starting mixture integrating over the peaks for water and the acid. Pressure integrity of the reactor system and air atmosphere replacement was accomplished by pressurization with nitrogen to 100 psig where the sealed reactor was held for 15 minutes without loss of pressure followed by venting to atmospheric pressure where the reactor was sealed. The reactor was then heated to 90 to 120° C. and held at target temperature for four hours. During this period of time the in situ IR reveals the presence of HESA, $SO_2$, and acetaldehyde in an equilibrium mixture. The higher temperature runs having the equilibrium shifted more towards the starting components than the lower temperature runs, indicative of a true equilibrium. At the end of four hours the acid reversal was accomplished via opening the gas cap of the reactor to an overhead condensation system for recovery of the acid and adjusting the reactor temperature to 100° C. This overhead system was comprised of a 1 liter jacketed flask fitted with a fiber optic based in situ IR probe, a dry ice acetone condenser on the outlet and the gas inlet arriving through an 18" long steel condenser made from a core of ¼" diameter C-276 tubing fitted inside of ½" stainless steel tubing with appropriate connections to achieve a shell-in-tube condenser draining downward into the recovery flask. The recovery flask was charged with about 400 grams of DI water and the condenser and jacketed flask cooled with a circulating fluid held at 1° C. The progress of the acid reversion was monitored via the use of in situ IR in both the Parr reactor and the overhead condensation flask. During the reversal the first component to leave the Parr reactor was $SO_2$ followed quickly by a decrease in the bands for HESA. Correspondingly the bands for $SO_2$ rise in the recovery flask and then quickly fall as HESA was formed from the combination of vaporized acetaldehyde with this component. The reversal was continued until the in situ IR of the Parr reactor showed no remaining traces of the α-hydroxyethane sulfonic acid. The IR of the overheads revealed that the concentration of the HESA at this point had reached a maximum and then started to decrease due to dilution with condensed water, free of α-hydroxyethane sulfonic acid components, building in the recovery flask. The reactor was then sealed and cooled to room temperature. The residual liquid in the Parr reactor and the overhead recovered acid was analyzed via proton NMR for HESA concentration. The results are shown in the table below indicating recovery of acid with virtually no residual HESA in the Parr reactor.

| Example | Starting [HESA] % wt. | Reaction Temp. ° C. | Reversal time (min.) | [HESA] in overhead (% wt.) | Mass overheaded (g.) | % of HESA recovered | Overall Mass Balance % |
|---|---|---|---|---|---|---|---|
| 42 | 10.01 | 90 | 42 | 15.15 | 243.1 | 96.9 | 99.4 |
| 43 | 10.07 | 105 | 39 | 14.33 | 241.4 | 91.3 | 99.3 |
| 44 | 5.11 | 105 | 40 | 7.39 | 255.1 | 94.7 | 99.5 |
| 45 | 5.36 | 120 | 37 | 8.42 | 163.3 | 88.5 | 99.4 |

Example 46

Acid Hydrolysis of Wheat Straw with 10% wt. α-Hydroxyethane Sulfonic Acid at 120° C. for One Hour Followed by Reversal and Overhead Recovery of the α-Hydroxyethane Sulfonic Acid.

Into a 2 liter C276 Parr reactor fitted with in situ IR optics was added 120.1 grams of compositional characterized wheat straw [dry basis: xylan 22.1% wt.; glucan 38.7% wt.] chopped to nominal 0.5 cm particles. To this was added 999.1 grams of 9.6% wt. α-hydroxyethane sulfonic acid (HESA) prepared by the dilution of a 40% wt. stock solution of the acid with deionized water. Target concentration of acid was confirmed by proton NMR of the starting mixture integrating over the peaks for water and the acid. The reactor was sealed and the pressure integrity of the reactor system and air atmosphere replacement was accomplished by pressurization with nitrogen to 100 psig where the sealed reactor was held for 15 minutes without loss of pressure followed by venting to atmospheric pressure where the reactor was sealed. The reactor was then heated to 120° C. and held at target temperature for one hour. During this period of time the in situ IR reveals the presence of HESA, $SO_2$, and acetaldehyde in an equilibrium mixture. At the end of the reaction period the acid reversal was accomplished via opening the gas cap of the reactor to an overhead condensation system for recovery of the acid and adjusting the reactor temperature to 100° C. This overhead recovery system was the same as used in examples 42-45 above. The progress of the acid reversion was monitored via the use of in situ IR in both the Parr reactor and the overhead condensation flask. The reversal was continued for a total of 52 minutes until the in situ IR of the Parr reactor showed no remaining traces of the α-hydroxyethane sulfonic acid or $SO_2$ in the reaction mixture. The reactor was then sealed and cooled to room temperature. The of overhead condensate added 182.6 grams of mass to the starting water and yielded a 15.0% wt. HESA solution (as analyzed by proton NMR) for a total acid recovery of 91% of the starting HESA employed. The cooled reactor was opened and the contents filtered through a medium glass frit funnel using a vacuum aspirator to draw the liquid through the funnel. The reactor was rinsed with three separate portions of water (noting weight on all rinses, totaling to 754 grams), the rinses being used to complete the transfer of solids and rinse the solids in the funnel. The residual solid was dried to a constant weight in the air and then analyzed for moisture content revealing that approximately 40% of the biomass had dissolved during the acid treatment. HPLC analysis of the 1362 grams of the filtrate plus rinses revealed a recovery of 87.6% of the starting xylan had converted to monomeric xylose and 8.2% of the starting cellulose had converted to glucose. The filtrate and overheads contained negligible amounts of furfural (0.1 grams total). Total material balance of recovered materials to starting materials was 98.2%.

Example 47

Acid Hydrolysis of Wet Ensiled, Expelled Sorghum with 10% wt. α-Hydroxyethane Sulfonic Acid at 100° C. for One Hour Followed by Reversal and Overhead Recovery of the α-Hydroxyethane Sulfonic Acid.

Into a 300 ml C276 Parr reactor fitted with in situ IR optics was added 26.6 grams of uncharacterized, wet ensiled sweet sorghum that had free moisture expelled, chopped to nominally <1 cm particles (this was 12.45 grams on a dry wt. basis). To this was added 100 grams of 19% wt. α-hydroxyethane sulfonic acid (HESA) prepared by the dilution of a 40% wt. stock solution of the acid with deionized water. Target concentration of acid was confirmed by proton NMR of the starting mixture integrating over the peaks for water and the acid. The reactor was sealed and the pressure integrity of the reactor system and air atmosphere replacement was accomplished by pressurization with nitrogen to 100 psig where the sealed reactor was held for 15 minutes without loss of pressure followed by venting to atmospheric pressure where the reactor was sealed. The reactor was then heated to 100° C. and held at target temperature for one hour. During this period of time the in situ IR reveals the presence of HESA, $SO_2$, and acetaldehyde in an equilibrium mixture. A growth in the bands characteristic of both glucose and xylose were noted during this time period. At the end of the reaction period the acid reversal was accomplished via opening the gas cap of the reactor to an overhead condensation system for recovery of the acid while maintaining the reactor temperature at 100° C. This overhead recovery system was a ¼" C-267 tube that extends downward into a 250 ml three neck round bottom flask charged with 70 grams of DI water, immersed in a wet ice bath and fitted with a dry ice/acetone condenser on the outlet. The progress of the acid reversion was monitored via the use of in situ IR in the Parr reactor. The reversal was continued until the in situ IR of the Parr reactor showed no remaining traces of the α-hydroxyethane sulfonic acid or $SO_2$ in the reaction mixture. The reactor was then sealed and cooled to room temperature. The of overhead condensate contained 90.45% of the HESA charged to the system as analyzed by proton NMR. The cooled reactor was opened and the contents filtered through a medium glass frit funnel using a vacuum aspirator to draw the liquid through the funnel. The reactor was rinsed with three separate portions of water, noting weight on all rinses, rinses being used to complete the transfer of solids and rinse the solids in the funnel. The residual solid was dried to a constant weight in the air and then analyzed for moisture content revealing that approximately 48% of the biomass had dissolved during the acid treatment. HPLC analysis of the filtrate plus rinses revealed cumulative recovery of 1.697 grams of monomeric xylose and 1.371 grams of monomeric glucose. The filtrate and overheads contained negligible amounts of furfural (0.015 grams total). Total material balance of recovered materials to starting materials was 96.4%. The relatively high levels of glucose recovered during this hydrolysis were due to the facile hydrolysis of starch (approx. 15% by wt.) in the starting biomass by HESA.

Example 48

Comparative Example, Hot Water Treatment of Wet Ensiled, Expelled Sorghum at 100° C. for One Hour.

Into a 300 ml C276 Parr reactor fitted with in situ IR optics was added 25.64 grams of uncharacterized, wet ensiled sweet sorghum that had free moisture expelled and chopped to nominally <1 cm particles (this was 12.00 grams on a dry wt. basis). This was the same starting material as example 47. To this was added 100 grams deionized water. The reactor was sealed and the pressure integrity of the reactor system and air atmosphere replacement was accomplished by pressurization with nitrogen to 100 psig where the sealed reactor was held for 15 minutes without loss of pressure followed by venting to atmospheric pressure where the reactor was sealed. The reactor was then heated to 100° C. and held at target temperature for one hour. At the end of the reaction period the sealed reactor was cooled to room temperature. The cooled reactor was opened and the contents filtered through a medium glass frit funnel using a vacuum aspirator to draw the liquid through the funnel. The reactor was rinsed with three separate portions of water, noting weight on all rinses, rinses being used to complete the transfer of solids and rinse the solids in the funnel. The residual solid was dried to a constant weight in the air. HPLC analysis of the filtrate plus rinses revealed cumulative recovery of 0.011 grams of monomeric xylose and 0.049 grams of monomeric glucose. No furfural was detected in this run. The negligible sugars obtained in the absence of the acid demonstrates the relative effectiveness of the α-hydroxysulfonic acid in the hydrolysis of sugars.

Example 49

Acid Hydrolysis of Corn Stover with 20% wt. α-Hydroxyethane Sulfonic Acid at 100° C. for One Hour Followed by Reversal and Overhead Recovery of the α-Hydroxyethane Sulfonic Acid.

Into a 300 ml C276 Parr reactor fitted with in situ IR optics was added 12.0 grams of uncharacterized corn stover chopped to nominally <1 cm particles (this was 10.96 grams of biomass on a dry wt. basis). To this was added 100 grams of 20% wt. α-hydroxyethane sulfonic acid (HESA) prepared by the dilution of a 40% wt. stock solution of the acid with deionized water. Target concentration of acid was confirmed by proton NMR of the starting mixture integrating over the peaks for water and the acid. The reactor was sealed and the pressure integrity of the reactor system and air atmosphere replacement was accomplished by pressurization with nitrogen to 100 psig where the sealed reactor was held for 15 minutes without loss of pressure followed by venting to atmospheric pressure where the reactor was sealed. The reactor was then heated to 100° C. and held at target temperature for one hour. During this period of time the in situ IR reveals the presence of HESA, $SO_2$, and acetaldehyde in an equilibrium mixture. At the end of the reaction period the acid reversal was accomplished via opening the gas cap of the reactor to an overhead condensation system for recovery of the acid while maintaining the reactor temperature at 100° C. This overhead recovery system was a ¼" C-267 tube that extends downward into a 250 ml three neck round bottom flask charged with 70 grams of DI water, immersed in a wet ice bath and fitted with a dry ice/acetone condenser on the outlet. The progress of the acid reversion was monitored via the use of in situ IR in the Parr reactor. The reversal was continued until the in situ IR of the Parr reactor showed no remaining traces of the α-hydroxyethane sulfonic acid or $SO_2$ in the reaction mixture. The reactor was then sealed and cooled to room temperature. The overhead condensate contained 90.00% of the HESA charged to the system as analyzed by proton NMR. The cooled reactor was opened and the contents filtered through a medium glass frit funnel using a vacuum aspirator to draw the liquid through the funnel. The reactor was rinsed with three separate portions of water, noting weight on all rinses, rinses being used to complete the transfer of solids and rinse the solids in the funnel. The residual solid was dried to a constant weight in the air and then analyzed for moisture content revealing that approximately 58.2% of the biomass was recovered. HPLC analysis of the filtrate plus rinses revealed cumulative recovery of 2.69 grams of monomeric xylose and 0.325 grams of monomeric glucose. The filtrate and overheads contained 0.023 grams of furfural (total).

We claim:

1. A method comprising:
   a) providing a biomass containing polysaccharides; and
   b) contacting the biomass with a solution containing at least one α-hydroxysulfonic acid thereby hydrolyzing the biomass to produce at least one fermentable sugar containing product.

2. The method of claim 1 wherein further comprising (c) removing the α-hydroxysulfonic acid in its component form from the product by heating and/or reducing pressure to produce an acid-removed product containing at least one fermentable sugar substantially free of the α-hydroxysulfonic acid.

3. The method of claim 1 wherein the α-hydroxysulfonic acid is present in an amount of from about 1% wt. to about 55% wt., based on the solution.

4. The method of claim 1 wherein the α-hydroxysulfonic acid is produced from (a) a carbonyl compound or a precursor to a carbonyl compound with (b) sulfur dioxide or a precursor to sulfur dioxide and (c) water.

5. The method of claim 1 wherein the α-hydroxysulfonic acid is in-situ generated.

6. The method of claim 3 wherein step (b) is carried out at a temperature within the range of about 50° C. to about 150° C. and a pressure within the range of 1 barg to about 10 barg.

7. The method of claim 2 wherein the α-hydroxysulfonic acid is present in an amount of from about 1% wt. to about 55% wt., based on the solution.

8. The method of claim 2 wherein the α-hydroxysulfonic acid is produced from (a) a carbonyl compound or a precursor to a carbonyl compound with (b) sulfur dioxide or a precursor to sulfur dioxide and (c) water.

9. The method of claim 2 wherein the α-hydroxysulfonic acid is in-situ generated.

10. The method of claim 7 wherein step (b) is carried out at a temperature within the range of about 50° C. to about 150° C. and a pressure within the range of 1 barg to about 10 barg.

11. The method of claim 1 wherein the at least one fermentable sugar comprises a pentose.

12. The method of claim 1 wherein the at least one fermentable sugar comprises a hexose.

13. The method of claim 1 wherein in step (b) at least one pentose and at least one hexose is produced.

14. The method of claim 1 further comprising (d) separating a liquid stream containing said fermentable sugar and a wet solid stream containing remaining biomass from the acid-removed product.

15. The method of claim 2 further comprising (d) separating a liquid stream containing said fermentable sugar and a wet solid stream containing remaining biomass from the acid-removed product.

16. The method of claim 15 further comprising (e) hydrolyzing the wet solid stream thereby producing a sugar stream.

17. The method of claim 16 further comprising (f) fermenting the sugar stream thereby producing fermented products.

18. The method of claim 2 further comprising hydrolyzing and fermenting the stream containing fermentable sugar thereby producing fermented products.

19. The method of claim 15 further comprising fermenting the liquid stream containing fermentable sugar.

20. The method of claim 2 wherein the α-hydroxysulfonic acid removed in step (c) is recycled to step (b) as components and/or in its recombined form.

21. The method of claim 7 wherein the α-hydroxysulfonic acid removed in step (c) is recycled to step (b) as components and/or in its recombined form.

22. The method of claim 9 wherein the α-hydroxysulfonic removed in step (c) is recycled to step (b) as components and/or in its recombined form.

23. The method of claim 10 wherein the α-hydroxysulfonic acid removed in step (c) is recycled to step (b) as components and/or in its recombined form.

24. The method of claim 6 wherein the α-hydroxysulfonic acid is present in an amount of from about 1% wt. to about 40% wt., based on the solution.

25. The process of claim 6 wherein the biomass is contacted with the α-hydroxysulfonic acid at a temperature of 120° C. or less.

26. The method of claim 2 wherein no more than about 2 wt % of the α-hydroxysulfonic acid is present in the acid-removed product.

27. The method of claim 4 wherein the carbonyl compound is an aldehyde.

28. The method of claim 1 wherein further comprising (c) removing at least a portion of the α-hydroxysulfonic acid in its component form from the product by heating and/or reducing pressure to produce an acid-removed product containing at least one fermentable sugar.

29. The method of claim 28 wherein no more than about 2 wt % of the α-hydroxysulfonic acid is present in the acid-removed product.

30. The method of claim 28 wherein the α-hydroxysulfonic acid is produced from (a) a carbonyl compound or a precursor to a carbonyl compound with (b) sulfur dioxide or a precursor to sulfur dioxide and (c) water.

31. The method of claim 28 wherein the α-hydroxysulfonic acid is present in an amount of from about 1% wt. to about 55% wt., based on the solution.

32. The method of claim 31 wherein step (b) is carried out at a temperature within the range of about 50° C. to about 150° C. and a pressure within the range of 1 barg to about 10 barg.

33. The method of claim 30 wherein the carbonyl compound is an aldehyde.

34. A method comprising:
   (a) providing a biomass containing polysaccharides;
   (b) contacting the biomass with a solution containing at least one α-hydroxysulfonic acid in an amount of from about 1% wt. to about 55% wt., based on the solution, at a temperature within the range of about 50° C. to about 150° C. and a pressure within the range of 1 barg to about 10 barg thereby hydrolyzing the biomass to produce at least one fermentable sugar containing product;
(c) removing at least a portion of the α-hydroxysulfonic acid in its component form from the product by heating and/or reducing pressure to produce an acid-removed product containing at least one fermentable sugar; and
(d) recycling the α-hydroxysulfonic acid removed in step (c) to step (b) as components and/or in its recombined form.

35. The method of claim 34 wherein no more than about 2 wt % of the α-hydroxysulfonic acid is present in the acid-removed product.

* * * * *